US009354387B2

(12) United States Patent
Hayashi

(10) Patent No.: US 9,354,387 B2
(45) Date of Patent: May 31, 2016

(54) OPTICAL WAVEGUIDE AND OPTICAL FIBER TRANSMISSION SYSTEM

(71) Applicant: SUMITOMO ELECTRIC INDUSTRIES, LTD., Osaka-shi, Osaka (JP)

(72) Inventor: Tetsuya Hayashi, Yokohama (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 14/730,461

(22) Filed: Jun. 4, 2015

(65) Prior Publication Data

US 2015/0268414 A1   Sep. 24, 2015

Related U.S. Application Data

(63) Continuation of application No. PCT/JP2013/082384, filed on Dec. 2, 2013.

(60) Provisional application No. 61/733,527, filed on Dec. 5, 2012.

(30) Foreign Application Priority Data

Dec. 5, 2012   (JP) .................................. 2012-266464
Aug. 23, 2013   (JP) .................................. 2013-173368

(51) Int. Cl.
  *G02B 6/036*   (2006.01)
  *G02B 6/30*   (2006.01)
  (Continued)

(52) U.S. Cl.
  CPC .......... *G02B 6/02042* (2013.01); *G02B 6/0365* (2013.01); *G02B 6/03627* (2013.01);
  (Continued)

(58) Field of Classification Search
  CPC .......... G02B 6/02042; G02B 6/03627; G02B 6/0365; G02B 6/03644; G02B 6/03666; G02B 6/42; G02B 6/4201; H04B 10/2504
  USPC .......................... 385/31–32, 49–52, 123–128
  See application file for complete search history.

(56) References Cited

U.S. PATENT DOCUMENTS 8,718,429 B2 * 5/2014 Hayashi ............. G02B 6/02042
385/126

FOREIGN PATENT DOCUMENTS

JP     S64-49002 A    2/1989
JP     2011-520152 A  7/2011
(Continued)

OTHER PUBLICATIONS

Y. Awaji et al., "Measurement and simulation of bending characteristics of homo- and hetero-geneous seven core fibers", IEICE Technical Report. OFT, Optical Fiber Technologies, 111(298) The Institute of Electronics, Information and Communication Engineers, Nov. 10, 2011, p. 21-p. 24, including English abstract.

(Continued)

*Primary Examiner* — Akm Enayet Ullah
*Assistant Examiner* — Michael Mooney
(74) *Attorney, Agent, or Firm* — Drinker Biddle & Reath LLP

(57) ABSTRACT

In an optical waveguide having plural cores including a pair of adjacent cores with an identical core structure, a minimum value D of center-center distance between the adjacent cores is 15 μm to 60 μm, each of the plural cores has a bent portion fixed in a radius of curvature $R_b$ of not more than 7 mm, a bend supplementary angle of the bent portion is 58° to 90°, a height of the optical waveguide is defined as a height of not more than 10 mm, and a crosstalk of the adjacent cores is not more than 0.01.

14 Claims, 19 Drawing Sheets

(51) Int. Cl.
*G02B 6/42* (2006.01)
*G02B 6/02* (2006.01)
*H04B 10/25* (2013.01)

(52) U.S. Cl.
CPC ........ *G02B6/03644* (2013.01); *G02B 6/03666* (2013.01); *G02B 6/42* (2013.01); *G02B 6/4201* (2013.01); *H04B 10/2504* (2013.01)

(56) References Cited

FOREIGN PATENT DOCUMENTS

| JP | 2011-209702 A | 10/2011 |
| JP | 2011-237782 A | 11/2011 |
| WO | WO-2011/114795 A1 | 9/2011 |
| WO | WO-2012/077699 A1 | 6/2012 |

OTHER PUBLICATIONS

T. Hayashi et al., "Design and fabrication of ultra-low crosstalk and low-loss multi-core fiber", Optics Express vol. 19, No. 17, Aug. 15, 2011, p. 16576-p. 16592.

M. Koshiba et al., "Analytical Expression of Average Power-Coupling Coefficients for Estimating Intercore Crosstalk in Multicore Fibers", IEEE Photonics Journal, vol. 4, No. 5, Oct. 2012, p. 1987-p. 1995.

K. Saitoh et al., "Homogeneous and Heterogeneous Multi-core Fibers", IEEE Summer Topicals 2012, TuC4.4, 2012.

K. Takenaga et al., "Reduction of Crosstalk by Quasi-Homogeneous Solid Multi-Core Fiber", OSA/OFC/NFOEC 2010, OWK7, 2010.

English-language translation of International Preliminary Report on Patentability (IPRP) dated Jun. 11, 2015 that issued in WO Patent Application No. PCT/JP2013/082384.

* cited by examiner

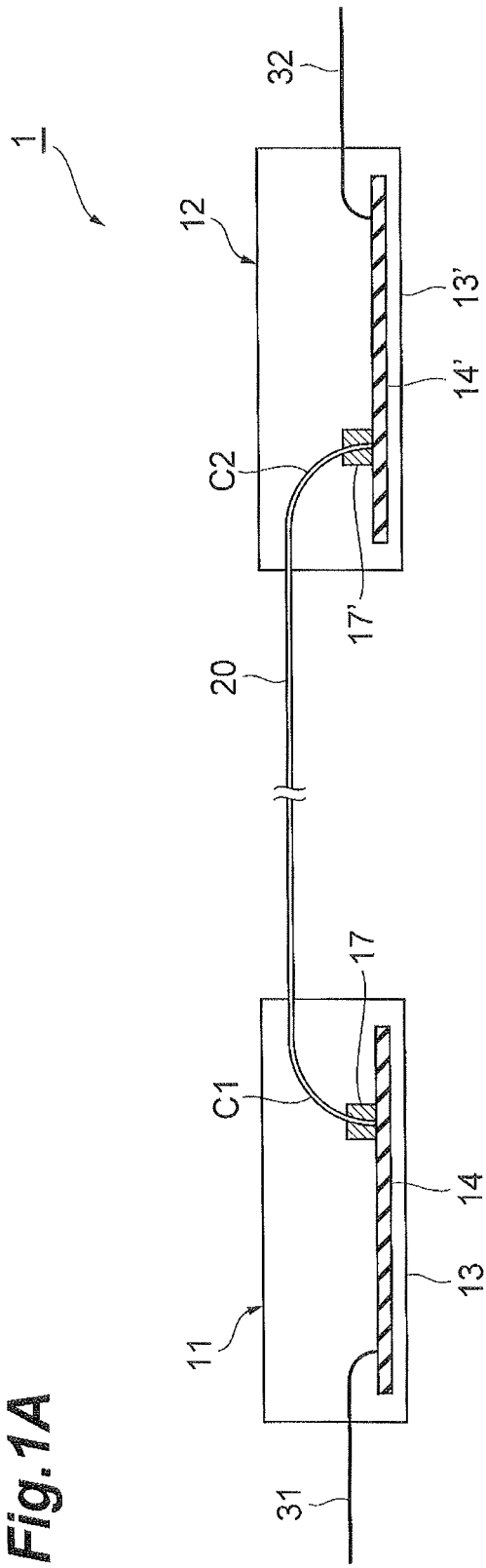
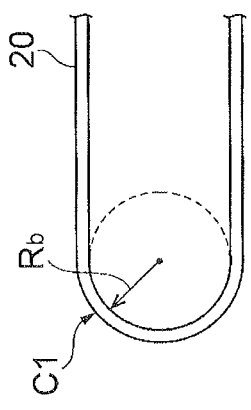
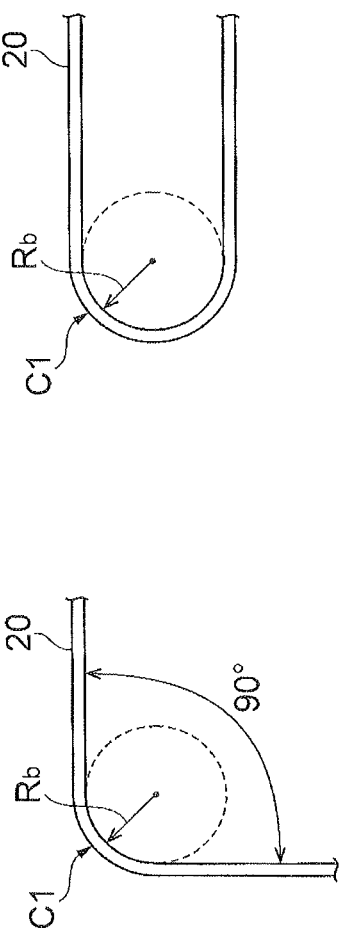

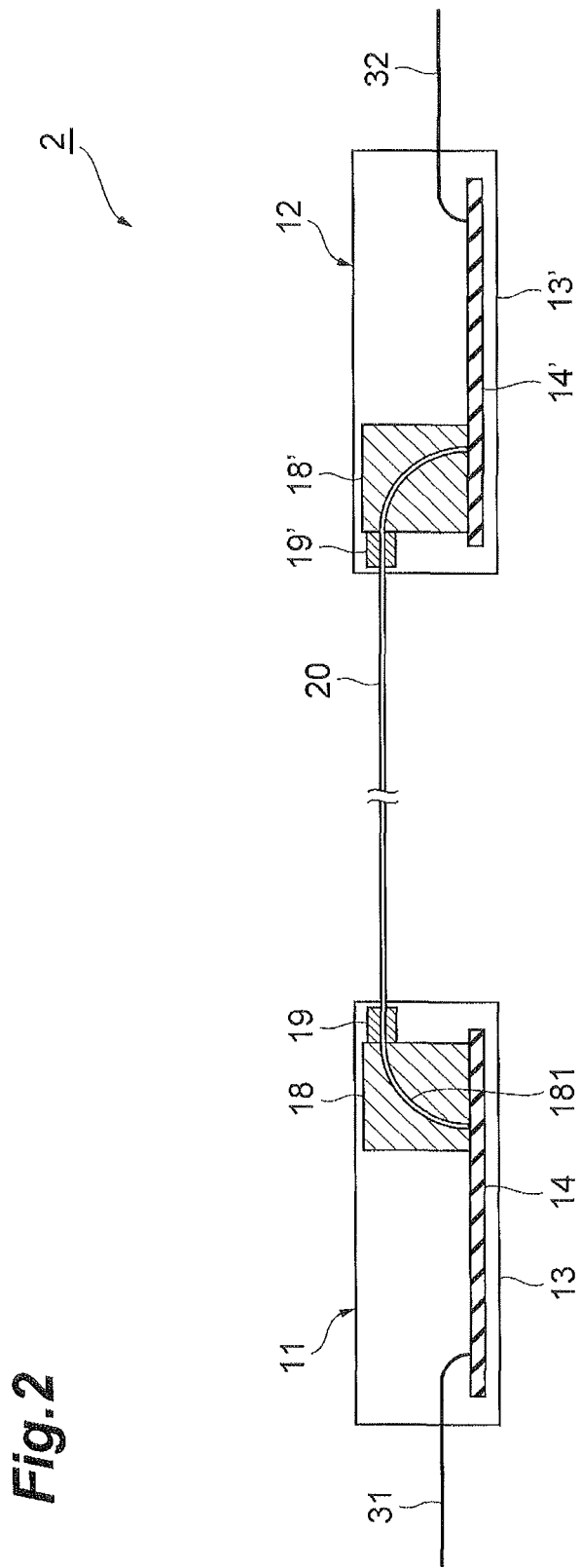

511
513  512

OPTICAL WAVEGUIDE AND OPTICAL FIBER TRANSMISSION SYSTEM

CROSS-REFERENCE TO RELATED APPLICATIONS

This is a continuation application of PCT/JP2013/082384 claiming the benefit of priorities of the Japanese Patent Application No. 2012-266464 filed on Dec. 5, 2012, the Japanese Patent Application No. 2013-173368 filed on Aug. 23, 2013, and U.S. Provisional Application No. 61/733,527 filed on Dec. 5, 2012, the entire contents of which are incorporated herein by reference.

BACKGROUND OF THE INVENTION

1. Field of the Invention

The present invention relates to an optical waveguide and an optical fiber transmission system, and specifically the optical waveguide includes a multi-core optical fiber (hereinafter referred to as optical fiber) and a multi-core optical waveguide (hereinafter simply referred to as optical waveguide).

2. Related Background Art

The optical fibers (MCFs) having plural cores extending along a fiber axis in a common cladding part are expected as optical transmission lines capable of transmitting large volumes of information.

SUMMARY OF THE INVENTION

It is, however, known that the multi-core optical fibers have the problem of degradation of signals due to inter-adjacent-core-crosstalk (hereinafter referred to as crosstalk) or the like. We discovered that the crosstalk increased contrary to the conventionally known information, particularly, when the optical fibers were used with a bend in an extremely small radius of curvature.

The present invention has been accomplished in view of the above circumstances and it is an object of the present invention to provide an optical fiber, an optical waveguide, and an optical fiber transmission system in which the increase of crosstalk is suppressed even in use with a bend in a small radius of curvature.

In order to achieve the object, an optical waveguide according to a first aspect comprises: plural cores including a pair of adjacent cores with an identical core-structure; a cladding covering each of plural cores; a first surface on which one ends of the plural cores are disposed; and a second surface on which the other ends of the plural cores are disposed, and the plural cores extend from the first surface to the second surface. In the optical waveguide, a minimum value D [μm] of center-to-center distance between the adjacent cores is a value in the range of 15 μm to 60 μm, and the optical waveguide satisfies any one condition of the following first to third conditions at a predetermined wavelength within a predetermined wavelength band.

The first condition is defined by:

(a) an optical fiber (multi-core optical fiber) serving as the optical waveguide;

(b) a difference of $\alpha_{90deg}$ between cores having the identical core-structure, the difference being not more than 1 dB where the of $\alpha_{90deg}$ is defined as a bending loss per 90° of a predetermined core while the optical fiber has a 90° bend in a predetermined radius of curvature $R_b$ [mm] of not more than 4 mm;

(c) a virtual crosstalk (linear value) in a 10-km fiber length between the adjacent cores at the center-to-center distance of the minimum value D, the virtual crosstalk being not more than 0.01 where the optical fiber has bend in a predetermined radius of curvature of 30 mm to 200 cm; and (d) the bending loss $\alpha_{90deg}$ of not more than a value represented by Expression (1) below where a measured crosstalk (linear value) in a predetermined fiber length of not more than 10 km is $XT_{w/oB}$ and the optical fiber has bend in a predetermined radius of curvature of 30 mm to 200 cm, or, the bending loss $\alpha_{90deg}$ of not more than a value represented by Expression (2) below where a cladding portion around each of the plural cores constitutes a trench-assisted type having a trench layer with a relative refractive-index difference of not more than −0.1% with respect to the cladding:

$$0.809\exp(6.64\times10^{-2}D)\sqrt{XT_{w/oB}}[\text{dB}/90°] \qquad (1); \text{ and}$$

$$1.42\exp(7.78\times10^{-2}D)\sqrt{XT_{w/oB}}[\text{dB}/90°] \qquad (2)$$

Here, "virtual crosstalk" means a linear value obtained by converting, after measuring a crosstalk in an optical fiber with a predetermined fiber length, the measured value to a value in the predetermined fiber length because a crosstalk (linear value) is proportional to a fiber length.

The second condition is defined by:

(a) Expression (3) below being defined as Expression (1) from which a definition concerning a fiber length is removed in the first condition; and Expression (4) below being defined as Expression (2) from which the definition concerning the fiber length is removed in the first condition:

$$0.809\exp(6.64\times10^{-2}D)\sqrt{10^{-3}R_b}[\text{dB}/90°] \qquad (3); \text{ and}$$

$$1.42\exp(7.78\times10^{-2}D)\sqrt{10^{-3}R_b}[\text{dB}/90°] \qquad (4).$$

Here, the case that the definition concerning a fiber length is removed from the first condition means the case of not considering the fiber length, and the case of not considering the fiber length assumes a case that a fiber length is unknown or a fiber length is very short of several ten meters.

The third condition is defined by:

(a) a bent portion of each of the plural cores, the bent portion being fixed in the minimum radius of curvature $R_b$ of not more than 7 mm;

(b) a crosstalk between the adjacent cores at the D serving as an adjacent core distance, the crosstalk being not more than 0.01;

(c) a bend supplementary angle falling within the range of 58° to 90°, the bend supplementary angle corresponding to a supplementary angle to an angle at a bending center side out of angles defined by straight portions sandwiching the bent portion in each of the plural cores;

(d) a plane serving as each of the first surface and the second surface, the plane enabling light entrance and light emission to each of the plural cores; and (e) a height of the optical waveguide with one of the first surface and the second surface being defined as a bottom surface, the height being not more than 10 mm. Here, the bend supplementary angle is an angle corresponding to a smaller angle out of angles defined by straight lines of the core sandwiching the bent portion.

According to the optical fiber as the optical waveguide, a low crosstalk can be maintained even though the optical fiber is bent in a minimal radius. In this specification, "minimal radius" means a radius of curvature of not more than 7 mm in the case of optical waveguide, and a radius of curvature of not more than 4 mm in the case of optical fiber.

As a second aspect applicable to the above first aspect, the optical waveguide, as the optical waveguide satisfying the first condition or the second condition, may comprise an inside cladding layer between each of the plural cores and the associated trench layer, the inside cladding having a refractive-index lower than that of each of the plural cores and higher than that of the associated trench layer. Further, as a third aspect applicable to at least any one of the above first and second aspects, in the optical waveguide satisfying the first condition or the second condition, a spatial mode of each of the plural cores is a fundamental mode, and a mode field diameter of the spatial mode at the predetermined wavelength may fall within the range of 5.6 µm to 15.7 µm. As a fourth aspect applicable to at least any one of the above first to third aspects, in the optical waveguide satisfying the first condition or the second condition, each of the plural cores may guide multiple spatial modes.

As a fifth aspect applicable to at least any one of the above first to fourth aspects, each of the plural cores may comprises plural sub-cores and a sub-cladding having a lower refractive-index lower than the plural sub-cores. In this fifth aspect, it is preferable that each of the plural sub-cores has an identical refractive-index profile structure, that the number of spatial modes of each of the plural cores is at least not less than the number of the plural sub-cores, and that inside each of the plural cores, a crosstalk between adjacent sub-cores is not less than 0.1.

As a sixth aspect applicable to at least any one of the above first to fifth aspects, in the optical waveguide satisfying the first condition or the second condition, it is preferable that the predetermined wavelength band is 1.26 µm to 1.625 µm. Such a predetermined wavelength band assumes a communication wavelength band used for a common silica-based optical fiber applicable to the optical waveguide. As a seventh aspect applicable to at least any one of the above first to sixth aspects, in the optical waveguide satisfying the first condition or the second condition, it is preferable that a cable cutoff wavelength of each of the plural cores is not more than 1.29 µm assuming the use of the optical waveguide in O-band, not more than 1.46 µm assuming the use of the optical waveguide in S-band, or not more than 1.53 µm assuming the use of the optical waveguide in C-band.

As an eighth aspect applicable to at least any one of the above first to seventh aspects, in the optical waveguide satisfies the first condition or the second condition, it is preferable that each of the plural cores has a cable cutoff wavelength of not more than 1.29 µm, that a mode field diameter at a wavelength of 1.31 µm falls within the range of 8.0 µm to 10.1 µm, and that at any one wavelength of 1.49 µm and 1.55 µm, the optical waveguide satisfies any one condition of the following fourth to seventh conditions. This structure indicates properties that each of the plural cores has to satisfy the case that the optical waveguide is applied to an optical interconnect system in a single-mode operation.

The fourth condition is defined by:
the bending loss $\alpha_{90deg}$ in the $R_b$ of 4 mm being not more than 0.139 dB/90°; or the bending loss $\alpha_{90deg}$ in the $R_b$ of 4 mm being not more than 0.288 dB/90° where the trench layer with the relative refractive-index difference of not more than −0.1% with respect to the cladding is provided between each of the plural cores and the cladding.

The fifth condition is defined by:
the bending loss $\alpha_{90deg}$ in the $R_b$ of 3 mm being not more than 0.120 dB/90°; or the bending loss $\alpha_{90deg}$ in the $R_b$ of 3 mm being not more than 0.250 dB/90° where the trench layer with the relative refractive-index difference of not more than −0.1% with respect to the cladding is provided between each of the plural cores and the cladding.

The sixth condition is defined by:
the bending loss $\alpha_{90deg}$ in the $R_b$ of 2 mm being not more than 0.098 dB/90°; or the bending loss $\alpha_{90deg}$ in the $R_b$ of 2 mm being not more than 0.204 dB/90° where the trench layer with the relative refractive-index difference of not more than −0.1% with respect to the cladding is provided between each of the plural cores and the cladding.

The seventh condition is defined by:
the bending loss $\alpha_{90deg}$ in the $R_b$ of 1 mm being not more than 0.069 dB/90°; or the bending loss $\alpha_{90deg}$ in the $R_b$ of 1 mm being not more than 0.144 dB/90° where the trench layer with the relative refractive-index difference of not more than −0.1% with respect to the cladding is provided between each of the plural cores and the cladding.

As a ninth aspect applicable to at least any one of the above first to eighth aspects, in the optical waveguide satisfying the first condition or the second condition, it is preferable that a cable cutoff wavelength of each of the plural cores is not more than 1.26 µm, that a mode field diameter at a wavelength of 1.31 µm falls within the range of 8.0 µm to 10.1 µm, and that at a wavelength of 1.49 µm, a bending loss $\alpha_{90deg}$ in the $R_b$ of 4 mm is not more than 0.139 dB/90°, and it is further preferable that the trench layer with the relative refractive-index difference of not more than −0.2% with respect to the cladding is provided between each of the plural cores and the cladding, and at the wavelength of 1.49 µm, the bending loss $\alpha_{90deg}$ in the $R_b$ of 4 mm is not more than 0.288 dB/90° where a relative refractive-index of each of the plural cores with respect to the cladding falls within the range of 0.24% to 0.35%.

As a tenth aspect applicable to at least any one of the above first to ninth aspects, the optical waveguide may include an optical fiber. In this case, the optical waveguide has the bent portion bent so that the bend supplementary angle falls within the range of 58° to 90°, in the bent portion, stress-generated strain caused inside the optical fiber by bending is relieved by a heat treatment processing, and the bent portion is bent with the supplementary angle while the $R_b$ is maintained even without external stress.

As a eleventh aspect, an optical fiber transmission system comprises a transmitter, a receiver, and an optical fiber as the optical waveguide according to at least any one of the above first to tenth aspects. In the optical fiber transmission system according to the eleventh aspect, each of the transmitter and the receiver comprises a waveguide chip capable of implementing input/output of light, and a housing internally having the waveguide chip. Each of the transmitter and the receiver is optically connected to the optical fiber so that a surface of the waveguide chip and the optical fiber take the form of an acute angle in the range of 74° to 90°. Further, in the housing, the optical fiber is provided with a bent of the $R_b$.

As a twelfth aspect applicable to at least any one of the above first to tenth aspects, it is preferable that the optical waveguide, satisfying the third condition, where the height of the optical waveguide is defined as a lower height of the optical waveguide in the other surface while defining one of the first surface and the second surface as a bottom surface, has either one of a first structure or a second structure, the first structure being defined by the $R_b$ of each of the plural cores of not more than 5 mm and the height of not more than 8 mm, the second structure being defined by the $R_b$ of each of the plural cores of not more than 3 mm and the height of not more than 6 mm.

As a thirteenth aspect applicable to at least any one of the above first to tenth and twelfth aspects, in the optical waveguide satisfies the third condition, it is preferable that a difference of insertion loss between of the plural cores is not more than 1 dB at the predetermined wavelength, and that the insertion loss is not more than a value represented by Expression (5) below, or, the insertion loss is not more than a value represented by Expression (6) below where the cladding portion around each of the plural cores constitutes the trench-assisted type having the trench layer with the relative refractive-index difference of not more than −0.1% with respect to the cladding:

$$0.809\exp(6.64\times10^{-2}D)\sqrt{10^{-3}R_b}[\text{dB}/90°] \quad (5); \text{ and}$$

$$1.42\exp(7.78\times10^{-2}D)\sqrt{10^{-3}R_b}[\text{dB}/90°] \quad (6).$$

As a fourteenth aspect applicable to at least any one of the above first to tenth, and twelfth to thirteenth aspects, the optical waveguide may comprise an inside cladding layer between each of the plural cores and the associated trench layer, the inside cladding having a refractive-index lower than that of each of the plural cores and higher than that of the associated trench layer.

As a fifteenth aspect applicable to at least any one of the above first to tenth, and twelfth to fourteenth aspects, in the optical waveguide satisfying the third condition, it is preferable that the predetermined wavelength band is 1.26 μm to 1.625 μm, and that a mode field diameter of a fundamental mode in each of the plural cores falls within the range of 5.6 μm to 15.7 μm.

As a sixteenth aspect, an optical fiber transmission system comprising a transmitter, a receiver, and a transmission line, and the transmission line includes an optical fiber satisfying the first condition and the second condition, according to at least any one of the above first to tenth, and twelfth to fifteenth aspects. Each of the transmitter and the receiver comprises a waveguide chip with a function to implement input/output of signal light, and a housing internally having the waveguide chip. In the housing, the optical fiber is optically connected to the waveguide chip through the optical waveguide satisfying the third condition, according to at least any one of the above first to tenth, and twelfth to fifteenth aspects. In each of the transmitter and the receiver, the surface of the waveguide chip and the plural cores of the optical waveguide in the housing take the form of acute angle in the range of 74° to 90°.

BRIEF DESCRIPTION OF THE DRAWINGS

FIGS. 1A to 1C are drawings illustrating a first configuration example of an optical transmission link configured including an optical fiber transmission system according to an embodiment.

FIG. 2 is a drawing illustrating a second configuration example of an optical transmission link configured including an optical fiber transmission system according to an embodiment.

DESCRIPTION OF THE EMBODIMENTS

Figure 3A:
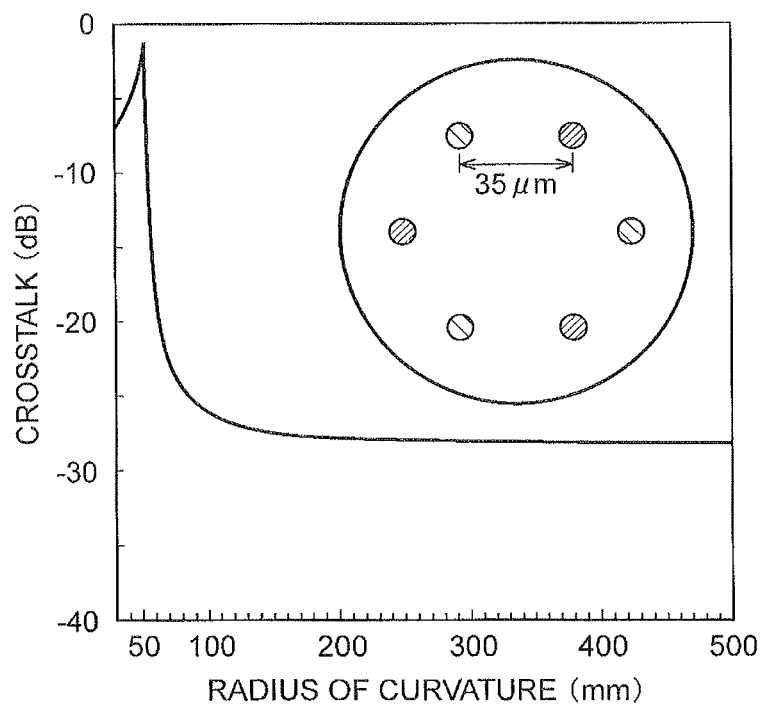
FIGS. 3A and 3B are drawings showing a relationship between crosstalk and radius of curvature of an optical fiber in a case where different types of cores are adjacent (FIG. 3A), and a relationship between crosstalk and radius of curvature of an optical fiber in a case where cores of an identical core-structure are adjacent (FIG. 3B).

Embodiments of the present invention will be described below in detail with reference to the accompanying drawings. The same elements will be denoted by the same reference signs in the description of the drawings, without redundant description. The main parameters used in the present specification are listed in Table 1 below.

TABLE 1

| Parameter | Unit | Description |
|---|---|---|
| D | μm | minimum center-center distance between adjacent cores |
| $XT_b$ | * | crosstalk increase due to bending loss |
| $XT_{b, max}$ | * | permissible maximum of $XT_b$ |
| $XT_{b, max90 deg}$ | * | $XT_{b, max}$ of core added with 90° bend in radius of curvature $R_b$ |
| $XT_{total}$ | * | total crosstalk in entire length of optical transmission link |
| $XT_{w/oB}$ | * | crosstalk of optical fiber added with bend in radius of curvature of 30 mm to 200 cm |
| $R_b$ | mm | radius of acceptable curvature |
| $L_b$ | m | bend interval length of core in radius of curvature $R_b$ |
| $\alpha_b$ | dB/m | bending loss coefficient of core in radius of curvature $R_b$ which can be expressed by $\alpha_b = \ln(P_1/P_0)/L_b$ where $P_0$ is output optical power of core in straight state and $P_1$ is output optical power of core with length $L_b$ bent in radius of curvature $R_b$ |
| $\alpha_{b, dB}$ | dB/m | bending loss of core in radius of curvature $R_b$ which can be expressed by $\alpha_{b, dB} = -10\log_{10}(P_1/P_0)/L_b$ |
| $\alpha_{90 deg}$ | dB/90° | bending loss while bending core at 90° bend in radius of curvature $R_b$ (allowing a value obtained by converting bending loss with different-angle bend to bending loss with 90° bend) |
| γ | m | correction factor: $XT_b = \gamma L_b(\alpha_b)^2$ |

The above symbol "*" is a linear value, and each crosstalk-related parameter in Expression is expressed by a linear value. Here, in the case that unit "dB" is used as a unit of these parameters in this specification and figures, these parameters are handles as a parameter expressed by "dB" value corresponding to the linear value. Calculated values of these parameters are similarly handled.

The below will describe a common configuration to the first and second embodiments of optical fibers. FIGS. 1A to 1C are drawings illustrating a first configuration example of an optical transmission link configured including an optical fiber (MCF) transmission system according to an embodiment of the present invention. The optical transmission link 1 shown in FIG. 1A is configured including two optical transceivers (OT) 11, 12, an optical fiber 20 connecting the OTs 11, 12, an electric signal line 31 connected to the OT 11, and an electric signal line 32 connected to the OT 12. Each of the OTs 11, 12 functions as transmitter or receiver. The optical fiber 20 connecting the OTs 11, 12 does not have to be limited to one consisting of a single fiber, but may be one consisting of plural optical fibers spliced by means of a connector, fusion splicing, or butting of end faces.

The OT 11 is configured including a housing 13, and a silicon photonics chip (waveguide chip, SPC) 14 disposed inside the housing 13 and functioning to implement input/output of light, and the electric signal line 31 and the optical fiber 20 are connected to the SPC 14. The optical fiber 20 has a bent portion C1 formed at an end with a bend in a minimal radius to be connected to the SPC 14, and is fixed to the SPC 14 by an MCF connection device 17.

The OT 12 is configured including a housing 13', and a SPC 14' disposed inside the housing 13', and the electric signal line 32 and the optical fiber 20 are connected to the SPC 14'. The optical fiber 20 has a bent portion C2 formed at an end with a bend in a minimal radius of not more than 10 mm to be connected to the SPC 14', and is fixed to the SPC 14' by an MCF connection device 17'.

For connecting the optical fiber 20 to the SPCs, as described above, the optical fiber 20 needs to be bent by about 90° in an extremely small radius of curvature inside the housing 13 (or 13'), in order to implement downsizing of the OTs 11, 12. FIG. 1B shows a state in which the optical fiber 20 is provided with a bend of 90° in the permissible radius of curvature $R_b$. FIG. 1C shows a state in which the optical fiber 20 is provided with a bend of 180° (or two 90° bends) in the $R_b$, and this corresponds to a state in which the optical fiber 20 is wound by a half winding on a mandrel with the $R_b$.

FIG. 2 is a drawing illustrating a second configuration example of an optical transmission link configured including an optical fiber (MCF) transmission system according to an embodiment of the present invention. The optical transmission link 2 shown in FIG. 2 is different in the following point from the optical transmission link 1 in FIGS. 1A to 1C. Namely, it is different from the optical transmission link 1 in that the optical fiber 20 is connected through an optical waveguide 18 to the SPC 14 in the housing 13 of the OT 11.

The optical waveguide 18 provided in the OT 11 has plural cores formed with a 90° bend in an extremely small radius of curvature inside, and the cores are connected to the respective cores in the optical fiber 20 in one end face, and connected to the SPC 14 in the other end face. The optical fiber 20 is connected and fixed to the optical waveguide 18 by an MCF connection device 19.

The same configuration is also applied to the OT 12. Namely, the OT 12 has a configuration wherein the optical fiber 20 is fixed to an optical waveguide 18' by an MCF connection device 19' and wherein the optical waveguide 18' is connected to the SPC 14'.

In the optical transmission link 2 in FIG. 2, the cores 181, 181' bent in a minimal radius are formed in the optical waveguides 18, 18', respectively. Namely, the optical transmission link 2 in FIG. 2 is configured so that the optical fiber 20 itself is not bent in a minimal radius but the cores 181, 181' are bent large inside the optical waveguides 18, 18'.

Incidentally, it is known that the crosstalk in the optical fiber is affected by the bend and twist given to the optical fiber, the structure of the fiber, and, particularly, longitudinal variation. The latest information is described in M. Koshiba, K. Saitoh, K. Takenaga, and S. Matsuo, "Analytical Expression of Average Power-Coupling Coefficients for Estimating Intercore Crosstalk in Multicore Fibers," IEEE Photon. J., vol. 4, no. 5, pp. 1987-1995, October 2012.

According to the above Literature, it is known that between cores of an identical core-structure having an equal effective refractive index, the crosstalk also monotonically decreases as the radius of curvature of the optical fiber becomes smaller. Between cores of heterogeneous structures having different effective refractive indices, the crosstalk suddenly increases once with decrease in the radius of curvature of the optical fiber and then the crosstalk also gradually decreases with further decrease in the radius of curvature thereafter.

Figure 3B:
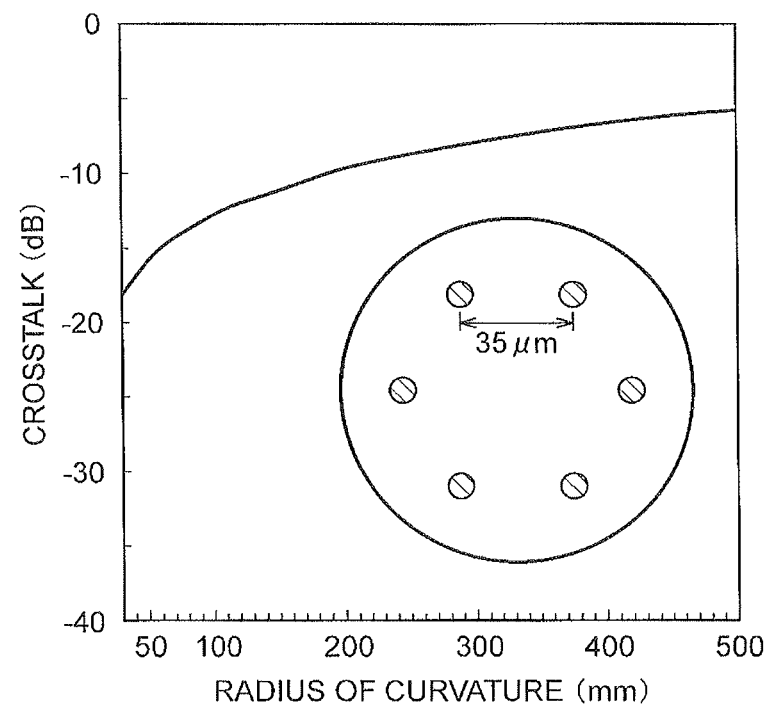

The foregoing relationships are shown in FIGS. 3A and 3B. FIG. 3A is a drawing showing the relationship between crosstalk and radius of curvature of the optical fiber where different types of cores are adjacent, and FIG. 3B a drawing showing the relationship between crosstalk and radius of curvature of the optical fiber where cores having an identical core-structure are adjacent. It was expected from the conventional information, as shown in FIGS. 3A and 3B, that the crosstalk decreased when the optical fiber was bent in extremely small radii of curvature, though there was the difference depending upon whether the types of adjacent cores are identical or not. The relationships of FIGS. 3A and 3B are shown in K. Saitoh, M. Koshiba, K. Takenaga, and S. Matsuo, "Homogeneous and Heterogeneous Multi-core Fibers" IEEE Summer Topicals 2012, TuC4.4.

Figure 7:
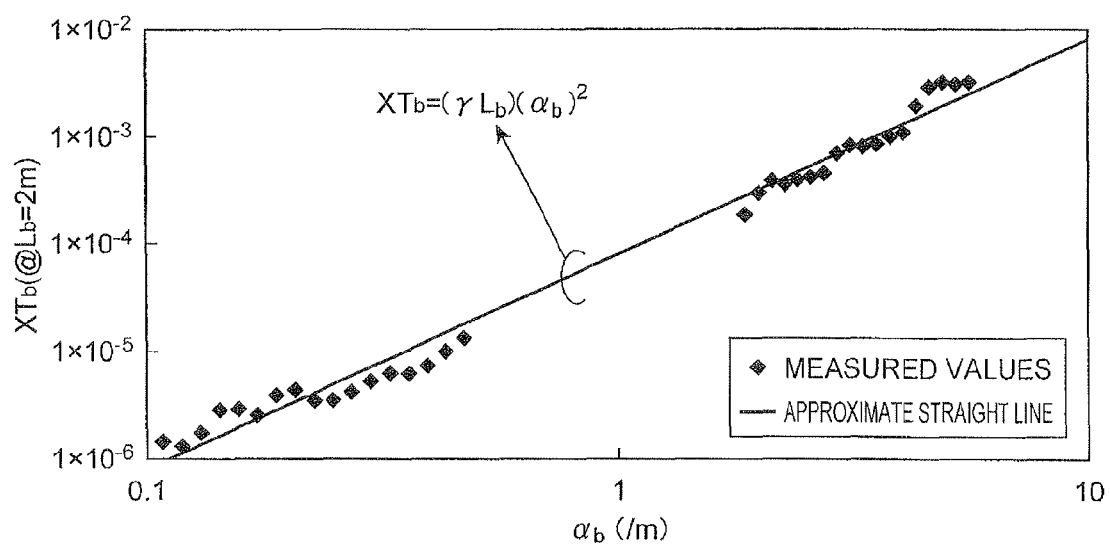
FIG. 7 is a drawing showing the result obtained by measuring values of bending loss coefficient $\alpha_b$ and bending-loss-caused crosstalk increase $XT_b$ in an optical fiber with plural cores each having an identical core-structure and a configuration in which a surrounding cladding has a matched-cladding type profile, for the first embodiment.

However, the Inventors discovered a phenomenon in which the crosstalk increased, contrary to the above information, when the optical fiber was bent in extremely small radii of curvature as shown in FIG. 7, namely when the bending loss increased. Then, we conducted research on a mechanism of the above-described increase of crosstalk.

We posited a hypothesis that the increase of crosstalk with the optical fiber being bent in extremely small radii of curvature was caused not by direct transfer of optical power between spatial modes propagating in respective cores, but by such indirect transfer that an optical power propagating a spatial mode of a certain core was coupled once to a cladding mode because of a bending loss and thereafter an optical power of the cladding mode was further coupled to a spatial mode of another core. The Inventors established a new theoretical model based on this hypothesis and conducted research, resulting in discovering that when the optical fiber is provided with a bend of a bending loss coefficient $\alpha_b$ [/m] in an interval of length $L_b$ [m], the crosstalk increase $XT_b$ due to the bending loss between homogeneous cores can be expressed by Expression (7) below.

$$XT_b \approx \gamma \alpha_b^2 L_b \tag{7}$$

In this expression, γ [m] represents a correction factor for taking account of a decrease of coupling coefficient of light from the cladding mode to the spatial mode of the core due to nonuniformity of optical power distribution in the cladding and positional relationship of the cores to be coupled with a bending direction.

We confirmed the validity of the above Expression (7) by prototyping an optical fiber in which each of plural cores has an identical core-structure and a peripheral cladding portion is a matched-cladding type and an optical fiber in which plural cores has an identical core-structure and a peripheral cladding portion is a trench-assisted type, and then checking relationships between the bending loss coefficient $\alpha_b$ and the bending loss-caused crosstalk increase $XT_b$, using them.

Figure 4A:
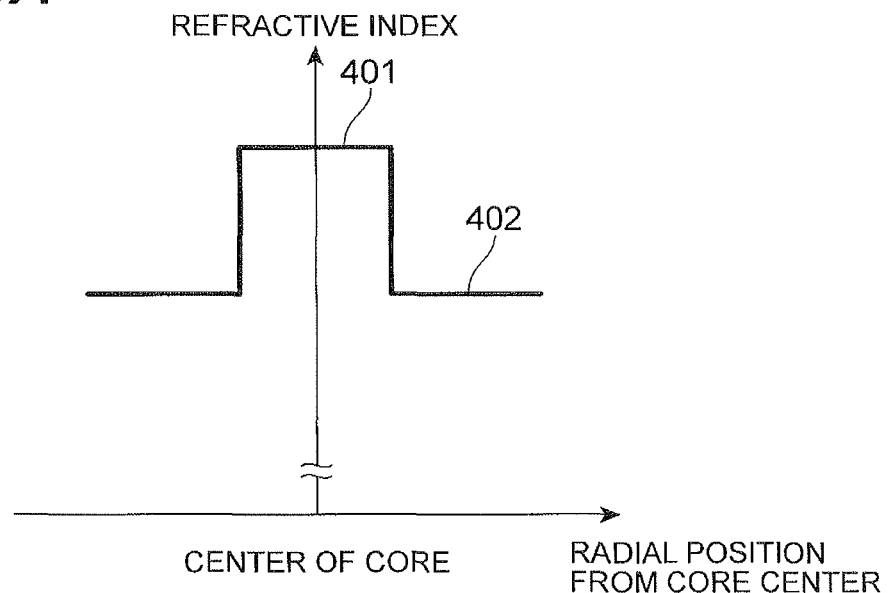
FIGS. 4A and 4B are drawings illustrating a configuration in which a cladding portion around a core has a matched-cladding type profile.
Figure 4B:
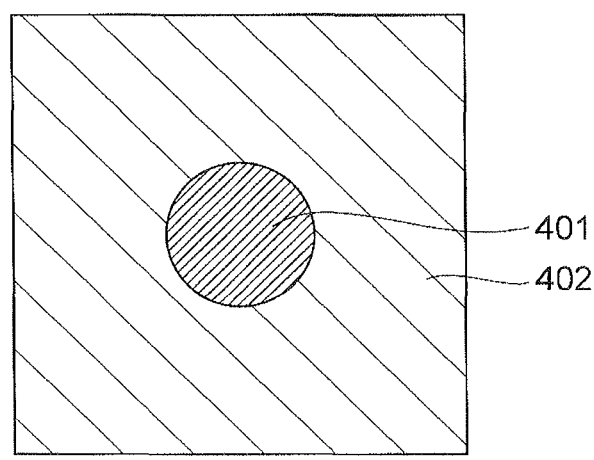

The core with the peripheral cladding portion of the matched-cladding type has a refractive index profile in the configuration shown in FIG. 4A. A cross-sectional view of the core and the periphery thereof is shown in FIG. 4B. Namely, in the configuration shown in FIGS. 4A and 4B, the periphery of the core 401 is covered around by a uniform cladding 402 having a lower refractive index than the core 401.

Figure 5A:
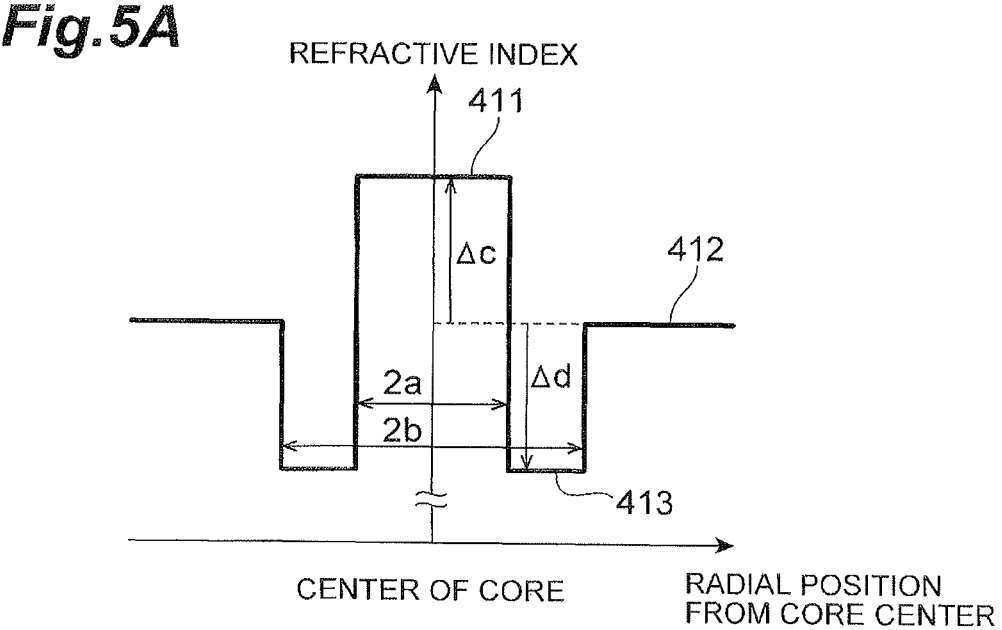
FIGS. 5A and 5B are drawings illustrating a first configuration in which a cladding portion around a core has a trench-assisted type profile.
Figure 5B:
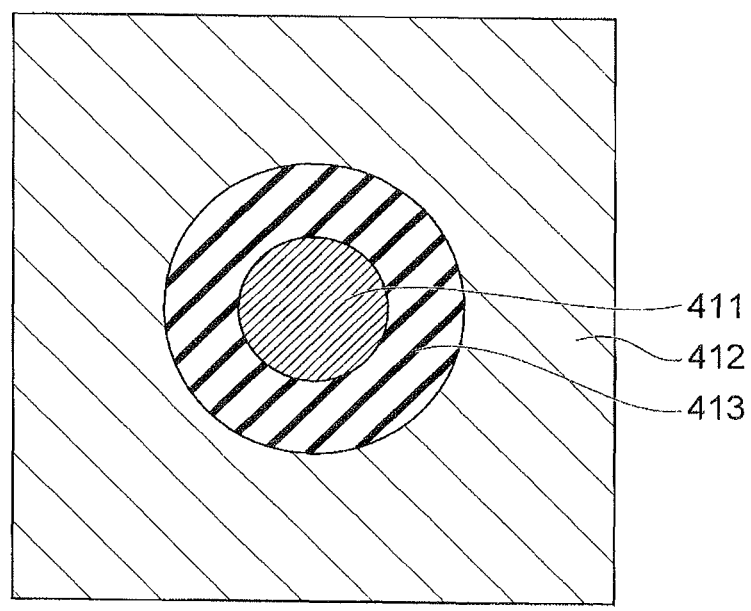

An example of a refractive index profile the core with the peripheral cladding portion of the trench-assisted type is shown in FIG. 5A and a cross-sectional view of the core and the periphery thereof is shown in FIG. 5B. In the trench-assisted type shown in FIGS. 5A and 5B, a trench layer 413 having a lower refractive index than the cladding 412 is provided between the core 411 and the cladding 412. In FIG. 5A, Δc represents a relative refractive-index difference of the core 411 with respect to the cladding 412, Δd a relative refractive-index difference of the trench layer 413 with respect to the cladding 412, 2a the core diameter, and 2b the outer diameter of the trench layer.

The optical communication in the transmission links using the SPCs in the transceivers is carried out mainly using light at the wavelength of 1.31 μm, 1.49 μm, or 1.55 μm. Particularly, short-haul optical communication is performed often using the wavelengths of 1.31 μm and 1.49 μm. The optical waveguides (including optical fibers) according to the present embodiment preferably, in short-haul use, have the cable cutoff wavelength of not more than 1.29 μm and the predetermined wavelength of not less than 1.49 μm, and preferably, in normal use, have the cable cutoff wavelength of not more than 1.26 μm and the predetermined wavelength of not less than 1.55 μm. In that case, the mode field diameter at the wavelength of 1.31 μm has a typical value of not less than 8.6 μm, a deviation from the typical value is preferably not more than ±0.6 μm, and the typical value is preferably not more than 9.5 μm. Namely, the mode field diameter at the wavelength of 1.31 μm is preferably in the range of 8.0 μm to 10.1 μm. The predetermined radius of curvature $R_b$ is preferably small in response to downsizing of connection device, such as not more than 4.0 mm, not more than 3.5 mm, not more than 3.0 mm, not more than 2.5 mm, not more than 2.0 mm, not more than 1.5 mm, and not more than 1.0 mm. In order to keep the bending loss-caused crosstalk increase $XT_b$ not more than 0.001 (or not more than −30 dB) per 90° bend even with D being sufficiently short, 15 μm, the combination (radius of curvature, maximum value of permissible bending loss), indicating the relationship between the predetermined radius of curvature (mm) and the maximum value)(dB/90° of permissible bending loss in a 90° bent at a predetermined wavelength, is preferably (4.0, 0.139), (3.5, 0.130), (3.0, 0.120), (2.5, 0.110), (2.0, 0.098), (1.5, 0.085), or (1.0, 0.069).

When the trench layer with the relative refractive-index difference of not more than −0.1% with respect to the cladding is provided between the cores and the cladding, the permissible bending loss in $R_b$ bent at a predetermined wavelength with respect to the permissible radius of curvature $R_b$ is 0.288 dB/90° with respect to 4.0 mm, 0.270 dB/90° with respect to 3.5 mm, t0.250 dB/90° with respect to 3.0 mm, 0.228 dB/90° with respect to 2.5 mm, 0.204 dB/90° with respect to 2.0 mm, 0.177 dB/90° with respect to 1.5 mm, and 0.144 dB/90° with respect to 1.0 mm.

For realizing the mode field diameter at the wavelength of 1.31 μm being 8.6 μm, the cable cutoff wavelength being not more than 1.26 μm, and the crosstalk increase $XT_{b,\,max90deg}$ at the wavelength of 1.49 μm due to one 90° bend in the radius of curvature $R_b$=4 mm being not more than 0.001 (or not more than −30 dB), the refractive index profile shown in FIG. 5A preferably has the trench layer, Δd is preferably not more than at least −0.2%, more preferably not more than −0.3%, and still more preferably not more than −0.5%. In view of the bending loss and cutoff wavelength, Δc is preferably not more than at least 0.35%, more preferably not more than 0.3%, and still more preferably not more than 0.25%. However, if Δc is too small, there will be a confinement loss which is a loss due to leakage of light confined in the core, into the cladding. For keeping the confinement loss not more than 0.01 dB/km, for example, at the wavelength of 1.55 μm, Δc is preferably not less than 0.24%. For setting the mode field diameter at the wavelength of 1.31 μm in the range of 8.0 μm to 9.2 μm, 2a is preferably determined in the range of 9.3 μm to 11.8 μm. Particularly, combinations of the parameters in (i) and (ii)

below can realize especially good characteristics in terms of all of the mode field diameter, bending loss, cutoff wavelength, and confinement loss.

(i) Δc=0.28%, Δd=−0.5%, 2a=10.6 μm, 1.95≤b/a≤2.4
(ii) Δc=0.30%, Δd=−0.5%, 2a=10.6 μm, 1.74≤b/a≤2.19

Figure 6A:
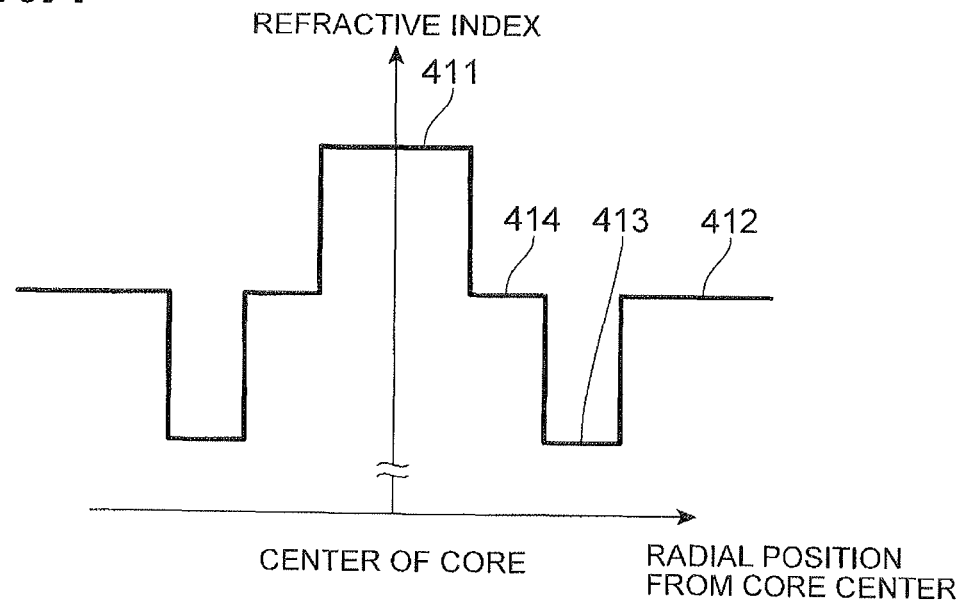
FIGS. 6A and 6B are drawings illustrating a second configuration in which a cladding portion around a core has a trench-assisted type profile.
Figure 6B:
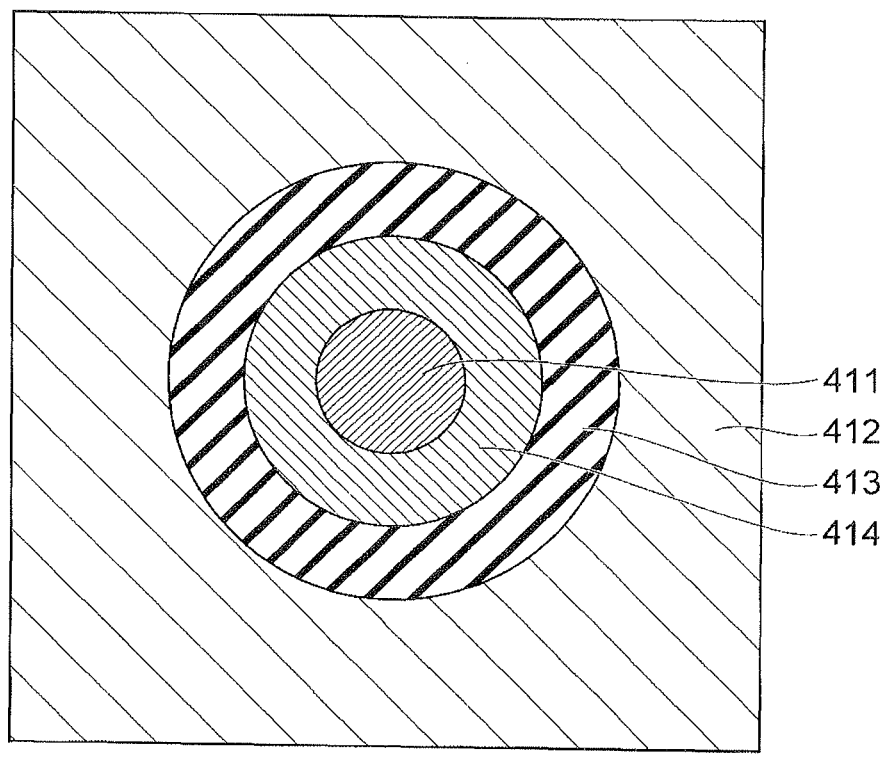

Next, a refractive index profile of another configuration example of the core with the peripheral cladding portion of the trench-assisted type is shown in FIG. 6A and a cross-sectional view of the core and the periphery thereof is shown in FIG. 6B. The trench-assisted type shown in FIGS. 6A and 6B may be provided with an inside cladding layer 414 having a refractive index lower than that of the core 411 and higher than that of the trench layer 413, between the core 411 and the trench layer 413. It should be noted that in FIGS. 4B, 5B, and 6B, the boundary around the cladding 412 does not mean the end of the cladding but means only a conceptual expression of a rectangular region extracted from the fiber cross section.

(First Embodiment of Optical Fiber)

Next, FIG. 7 shows the result obtained by measuring values of the bending loss coefficient $\alpha_b$ and the bending loss-caused crosstalk increase $XT_b$ in the optical fiber in which each of plural cores has an identical core-structure and a peripheral cladding portion is a matched-cladding type, and finding a relationship between them. The bending loss-caused crosstalk increase $XT_b$ was measured from an increase (linear value) of a crosstalk with a bend in a certain radius of curvature to cause a bending loss, in an interval of 2 m of the sufficiently long optical fiber, from a crosstalk without the bend.

On the basis of the conventional information, the crosstalk must decrease in the interval with the bend. Since the length of the interval with the bend is sufficiently shorter than the entire length of the optical fiber, the crosstalk in the unbent intervals should show little change and the foregoing increase can be regarded as the bend-caused crosstalk increase $XT_b$ represented by Expression (7). Since FIG. 7 is a double logarithmic graph, the graph is represented by a straight line when satisfying the relation of $y=cx^d$ (y is a vertical axis parameter; x is a horizontal axis parameter). By taking the logarithm of both sides of this equation, we obtain log(y)=d log(x)+log(c). Namely, it is seen that d affects the slope of the straight line and c the y-intercept of the straight line. While this equation of the straight line is compared with FIG. 7, a further study will be made on the basis of the above Expression (7). According to this study, x corresponds to $\alpha_b$, and $\gamma L_b$ does to c, d becomes 2, from Expression (7); therefore, a line obtained by fitting Expression (7) having only γ as a variable to the measured values is the straight line in FIG. 7. FIG. 7 includes the measured data at different levels of radii of curvature and wavelengths. However, it was confirmed that, as shown in FIG. 7, the relationship between $XT_b$ and $\alpha_b$ satisfied Expression (7), irrespective of the radii of curvature and the wavelengths, and that α varied depending on the core pitch.

Figure 8:
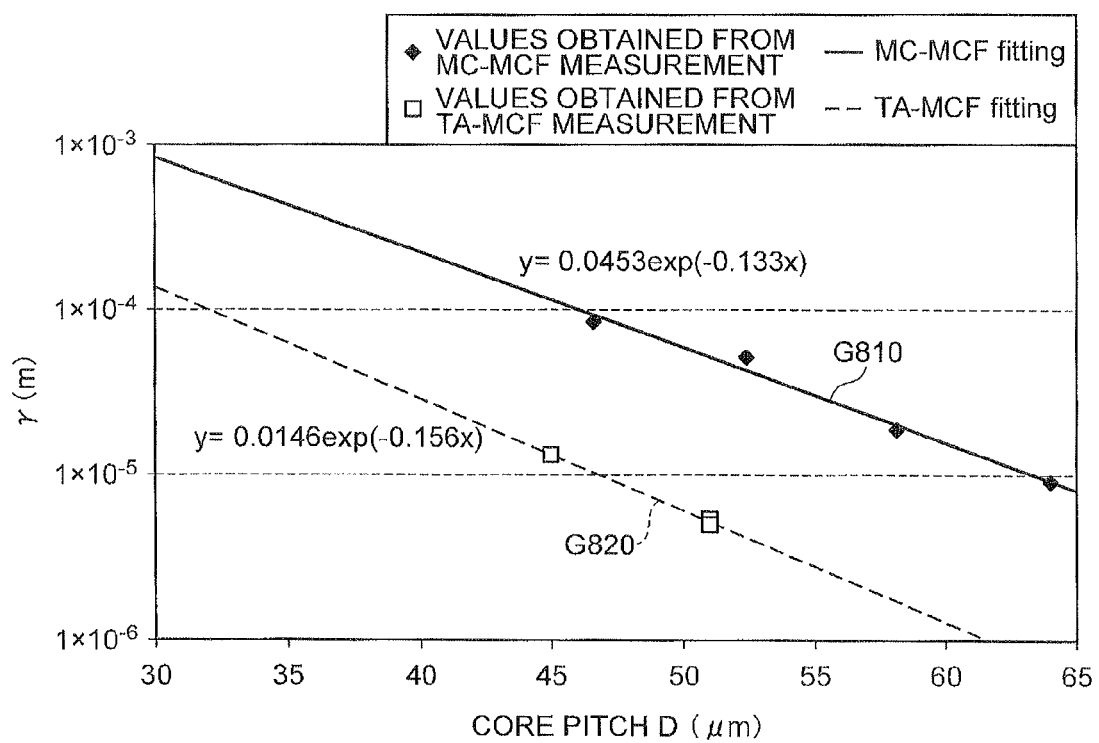
FIG. 8 is a drawing showing relationships between coefficient $\alpha$ about bending-loss-caused crosstalk increase and core pitch D between cores each having an identical core-structure and a configuration in which a surrounding cladding has a matched-cladding type profile, or, between cores each having an identical core-structure and a configuration in which a surrounding cladding portion has a trench-assisted type profile, for the first embodiment.

Next, FIG. 8 shows relationships between the core pitch D and the factor γ about the bending loss-caused crosstalk increase in optical fibers each having plural cores with an identical core-structure, a peripheral cladding portion of a matched-cladding type, and plural different core pitches (MC-MCFs) and in optical fibers each having plural cores an identical core-structure, a peripheral cladding portion of a trench-assisted type cores, and plural different core pitches (TA-MCFs). In FIG. 8, graph G810 represents an approximate straight line for the measured values of the MC-MCFs given by y=0.0453exp(−0.133x), and graph G820 an approximate straight line for the measured values of the TA-MCFs given by y=0.0146exp(−0.156x). The factor α is also dependent on the positional relationship between cores, and maxima of α acquired at the respective core pitches are plotted in FIG. 8. It was confirmed from the result of FIG. 8 that γ exponentially decreased with increase of D in the both cases between the cores with the peripheral cladding portion of the matched-cladding type and between the cores with the peripheral cladding portion of the trench-assisted type. Specifically, in the case between the cores with the peripheral cladding portion of the matched-cladding type, Expression (8) below is satisfied, and in the case between the cores with the peripheral cladding portion of the trench-assisted type, Expression (9) below is satisfied. The unit of γ is [m] and the unit of D [μm]. In the case with the trench layer, the optical power leaking into the cladding is less likely to enter the regions inside the trenches around the other cores (i.e., overlaps of electric fields between the core mode and the cladding mode become smaller), and therefore it is understood that α becomes smaller than in the case without the trench layer. Therefore, in cases where even if there is a layer having a lower refractive index than the cladding between the cores and the cladding of the optical fiber, the refractive index of that layer is not low enough (e.g., the relative refractive-index difference with respect to the cladding is more than −0.1%), γ of the fiber is considered to be expressed by Expression (8). For γ to be expressed by Expression (9), it can be said that the refractive index of the trench layer is preferably sufficiently lower than that of the cladding and that at least the relative refractive-index difference of the trench layer with respect to the cladding is preferably not more than −0.1%, more preferably not more than −0.2%, still more preferably not more than −0.3%, yet more preferably not more than −0.4%, yet more preferably not more than −0.5%, yet more preferably not more than −0.6%, and yet furthermore preferably not more than −0.7%.

$$\gamma = 4.53 \times 10^{-2} \exp(-1.33 \times 10^{-1} D) \qquad (8)$$

$$\gamma = 1.46 \times 10^{-2} \exp(-1.56 \times 10^{-2} D) \qquad (9)$$

By finding the bending loss-caused crosstalk increase occurring between the cores each having the identical core-structure and the peripheral cladding portion of the matched-cladding type cores on the basis of the above Expressions (7) and (8), using the relational expression $\alpha_b$ [/m]=(ln 10/10)$\alpha_{b,dB}$ [dB/m] about the bending loss coefficient $\alpha_b$, we obtain Expression (10) below.

$$XT_b \approx [4.53 \times 10^{-2} \exp(-1.33 \times 10^{-1} D)]\left(\frac{\ln 10}{10}\alpha_{b,dB}\right)^2 L_b \qquad (10)$$
$$\approx 2.40 \times 10^{-3} \alpha_{b,dB}^2 L_b \exp(-1.33 \times 10^{-1} D)$$

By finding the bending loss-caused crosstalk increase occurring between the cores each having the identical core-structure and the peripheral cladding portion of the trench-assisted type on the basis of the above Expressions (7) and (9), we obtain Expression (11) below.

$$XT_b \approx [1.46 \times 10^{-2} \exp(-1.56 \times 10^{-1} D)]\left(\frac{\ln 10}{10}\alpha_{b,dB}\right)^2 L_b \qquad (11)$$
$$\approx 7.74 \times 10^{-4} \alpha_{b,dB}^2 L_b \exp(-1.56 \times 10^{-1} D)$$

When a permissible maximum of the bending loss-caused crosstalk increase $XT_b$ is denoted by $XT_{b,max}$, it is found from Expression (10) that $XT_b$ can be controlled to not more than the permissible maximum $XT_{b,\,max}$ when the optical fiber composed of the cores each having the identical core-structure and the peripheral cladding portion of the matched-cladding type (or, composed of the cores each having the peripheral cladding portion in which the trench layer of the sufficiently-low refractive index is not provided) satisfies Expression (12) below.

$$2.40 \times 10^{-3} \alpha_{b,dB}{}^2 L_b \exp(-1.33 \times 10^{-1} D) \leq \frac{XT_{b,max} \alpha_{b,dB} L_b \leq 20.4 \exp(6.64 \times 10^{-2} D)}{\sqrt{XT_{b,max} L_b}} \quad (12)$$

It is also found from Expression (11) that $XT_b$ can be controlled to not more than the permissible maximum $XT_{b,\,max}$ when the optical fiber composed of the cores each having the identical core-structure and the peripheral cladding portion of the trench-assisted type (or, composed of the cores each having the peripheral cladding portion in which the trench layer of the sufficiently-low refractive index is provided) satisfies Expression (13) below.

$$7.74 \times 10^{-4} \alpha_{b,max}{}^2 L_b \exp(-1.56 \times 10^{-1} D) \leq \frac{XT_{b,max} \alpha_{b,dB} L_b \leq 35.9 \exp(7.78 \times 10^{-2} D)}{\sqrt{XT_{b,max} L_b}} \quad (13)$$

The bending loss $\alpha_{90deg}$ [dB/90°] occurring with a 90° bend of the cores in the radius of curvature $R_b$ [mm] needs to satisfy Expression (14) below in order to control $XT_b$ to not more than maximum $XT_{b,max90deg}$, based on Expression (12), in the optical fiber composed of the cores each having the identical core-structure and the peripheral cladding portion of the matched-cladding type (or, composed of the cores each having the peripheral cladding portion in which the trench layer of the sufficiently-low refractive index is not provided), where $XT_{b,\,max90deg}$ represents a permissible maximum of the bend-caused crosstalk increase $XT_b$ due to the bend in the 90° bent case and a relational expression of $L_b$ [m]=$(\pi/2)(10^{-3} R_b)$ is used.

$$\alpha_{90deg} \leq 0.809 \exp(6.64 \times 10^{-2} D) \sqrt{XT_{b,max90deg} R_b} \quad (14)$$

In the case of the optical fiber composed of the cores each having the identical core-structure and the peripheral cladding portion of the trench-assisted type (i.e., composed of the cores each having the peripheral cladding portion in which the trench layer of the sufficiently-low refractive index is provided), the bending loss $\alpha_{90deg}$ needs to satisfy Expression (15) below in order to control $XT_b$ to not more than the maximum $XT_{b,max90deg}$, based on Expression (13).

$$\alpha_{90deg} \leq 1.42 \exp(7.78 \times 10^{-2} D) \sqrt{XT_{b,max90deg} R_b} \quad (15)$$

(Second Embodiment of Optical Fiber)

Figure 9:
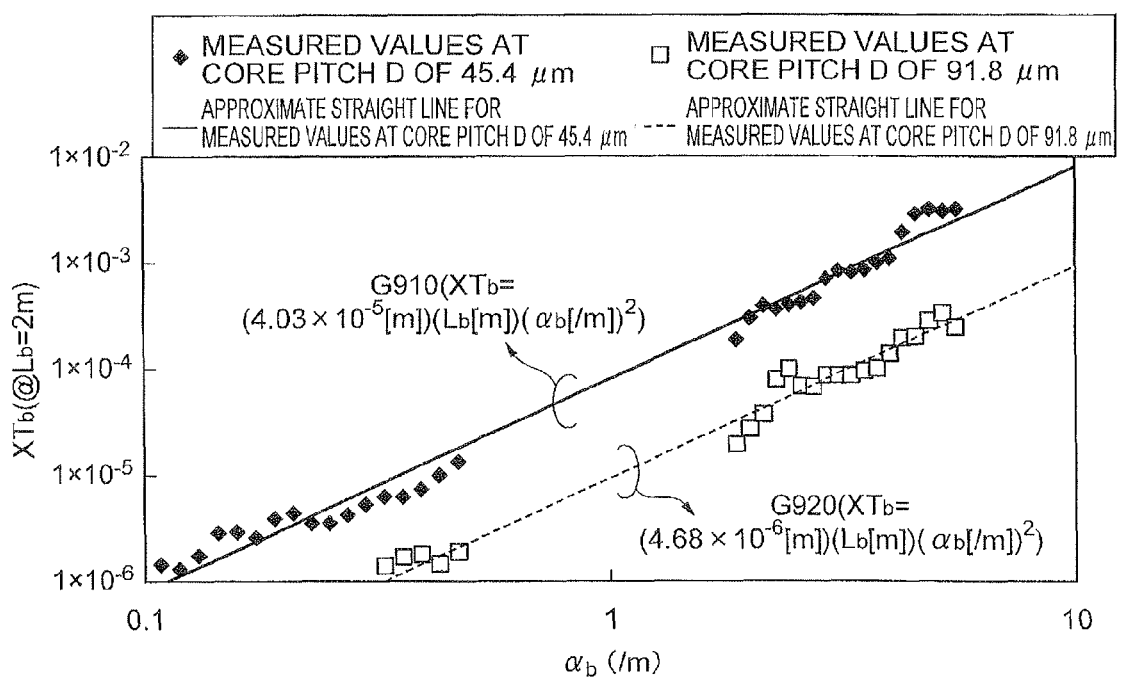
FIG. 9 is a drawing showing the result obtained by measuring values of bending loss coefficient $\alpha_b$ and bending-loss-caused crosstalk increase $XT_b$ in optical fibers with plural cores each having an identical structure and a configuration in which a surrounding cladding portion has a matched-cladding type profile, for the second embodiment.

In the second embodiment, FIG. 9 shows the result obtained by measuring values of the bending loss coefficient $\alpha_b$ and the bending loss-caused crosstalk increase $XT_b$ in optical fibers in which each of plural cores has an identical core-structure and a peripheral cladding portion is a matched-cladding type, and finding relationships between them, i.e., graphs corresponding to FIG. 7 in the first embodiment. In the case of this second embodiment, as in the first embodiment, FIG. 9 also shows double logarithmic graphs, and thus the graphs are represented by straight lines when satisfying the relation of $y=cx^d$. By taking the logarithm of both sides of this equation, we obtain $\log(y)=d \log(x)+\log(c)$. Namely, it is seen that d affects the slope of the straight line and c the intercept of the straight line. While this equation of the straight line is compared with FIG. 9, a further study will be made on the basis of the foregoing Expression (7). According to this study, x corresponds to $\alpha_b$, and $\gamma L_b$ does to c, d becomes 2 from Expression (7); therefore, lines obtained by fitting Expression (7) having only $\gamma$ as a variable to the measured values are the straight line and dashed line in FIG. 9. FIG. 9 includes the measured data at different levels of radii of curvature and wavelengths, at each of two levels of core pitches, 45.4 µm (graph G910) and 91.8 µm (graph G920). Graph G910 shows the approximate straight line $XT_b=(4.03 \times 10^{-5} \text{ [m]})(\alpha_b[/m])^2(L_b[m])$ and Graph G920 the approximate straight line $XT_b=(4.68 \times 10^{-6} \text{ [m]})(\alpha_b[/m])^2(L_b[m])$. However, it was confirmed that, as shown in FIG. 9, the relationships between $XT_b$ and $\alpha_b$ satisfied Expression (7), irrespective of the radii of curvature and the wavelengths, and that $\gamma$ varied depending on the core pitch.

Figure 10:
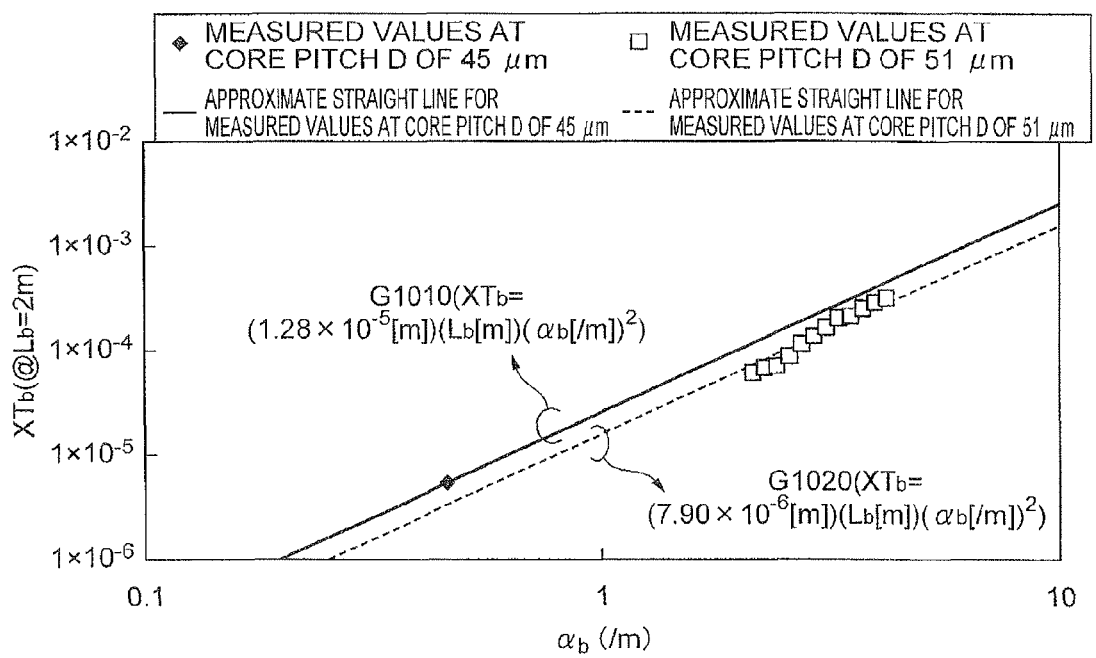
FIG. 10 is a drawing showing the result obtained by measuring values of bending loss coefficient $\alpha_b$ and bending-loss-caused crosstalk increase $XT_b$ in optical fibers with plural cores each having an identical structure and a configuration in which a surrounding cladding portion has a trench-assisted type profile, for the second embodiment.

Next, FIG. 10 shows, as FIG. 9 does, the result obtained by measuring values of the bending loss coefficient $\alpha_b$ and the bending loss-caused crosstalk increase $XT_b$ in optical fibers in which each of plural cores has an identical core-structure and a peripheral cladding portion is a trench-assisted type, and finding relationships between them. The trench layer of the optical fibers is one having the relative refractive-index difference of not more than −0.4% with respect to the cladding and the ratio of the inner diameter to the outer diameter of the trench layer being not more than 0.9. The measured values in FIG. 10 include the measured data at different levels of radii of curvature and wavelengths, at each of two levels of core pitches, 45 µm (graph G1010) and 51 µm (graph G1020). Graph G1010 shows the approximate straight line $XT_b=1.28 \times 10^{-5}$ [m] $(=(\alpha_b[/m])^2(\gamma L_b[m]))$ and Graph G1020 the approximate straight line $XT_b=7.90 \times 10^{-6}$ [m] $(=(\alpha_b[/m])^2(\gamma L_b[m]))$. However, it was confirmed that, as shown in FIG. 10, the relationships between $XT_b$ and $\alpha_b$ satisfied Expression (7), irrespective of the radii of curvature and the wavelengths, and that $\gamma$ varied depending on the core pitch. This result is the same as in the case of the optical fibers shown in FIG. 9, having the cores with the peripheral cladding portion of the matched-cladding type.

Figure 11:
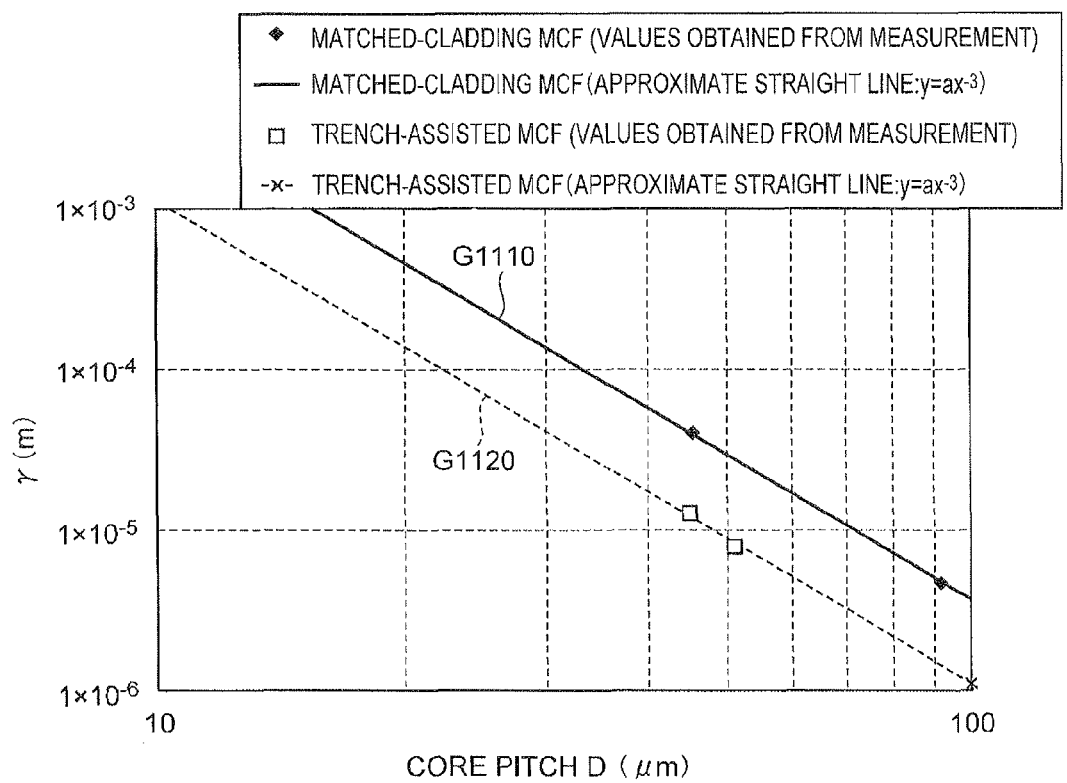
FIG. 11 is a drawing showing relationships between coefficient $\alpha$ about bending-loss-caused crosstalk increase and core pitch D between cores each having an identical structure and a configuration in which a surrounding cladding portion has a matched-cladding type profile, or, between cores each having an identical structure and a configuration in which a surrounding cladding portion has a trench-assisted type profile, for the second embodiment.

FIG. 11 shows relationships between the coefficient $\gamma$ about the bending loss-caused crosstalk increase and the core pitch D between cores each having the identical core-structure and the peripheral cladding portion of the matched-cladding type or between the cores each having the identical core-structure and the peripheral cladding portion of the trench-assisted type. In FIG. 11, graph G1110 represents an approximate straight line $(y=Cx^{-3})$ for the matched-cladding optical fibers (matched-cladding MCFs), and graph G1120 an approximate straight line $(y=cx^{-3})$ for the trench-assisted optical fibers (trench-assisted MCFs). It was confirmed from the result of FIG. 11 that the both cases between the cores with the peripheral cladding portion of the matched-cladding type and between the cores with the peripheral cladding portion of the trench-assisted type satisfied the relation of $\gamma \propto D^{-3}$. Specifically, in the case between the cores with the peripheral cladding portion of the matched-cladding type, Expression (16) below is satisfied, and in the case between the cores with the peripheral cladding portion of the trench-assisted type, Expression (17) below is satisfied. The unit of $\gamma$ is [m] and the unit of D [µm]. In the case with the trench layer, the optical power leaking into the cladding is less likely to enter the regions inside the trenches around the other cores (i.e., overlaps of electric fields between the core mode and the cladding mode become smaller). Regarding the optical power leaking into the cladding, in this case, $\gamma$ becomes smaller than in the case without the trench layer. Therefore, in cases where even if there is a layer having a lower refractive index than the cladding between the cores and the cladding of the optical fiber, the refractive index of that layer is not low enough (e.g., the relative refractive-index difference of the layer with respect to the cladding is more than −0.1%), $\gamma$ of the fiber is considered to be expressed by Expression (16). For $\gamma$ to be expressed by Expression (17), it can be said that the refractive index of the trench layer is preferably sufficiently lower than that of the cladding and that at least the relative refractive-index difference of the trench layer with respect to the cladding is preferably not more than −0.1%, more preferably not more than −0.2%, still more preferably not more than −0.3%, yet more preferably not more than −0.4%, yet more preferably not more than −0.5%, yet more preferably not more than −0.6%, and yet furthermore preferably not more than −0.7%.

$$\gamma = \frac{3.7}{D^3} \quad (16)$$

$$\gamma = \frac{1.1}{D^3} \quad (17)$$

The description in the foregoing six paragraphs after Expression (9) about the first embodiment also applies to this second embodiment. However, when the description in the foregoing six paragraphs after Expression (9) applies to this second embodiment, the description in each paragraph should be read as follows: the above Expression (10) is replaced by Expression (18) below; the above Expression (11) by Expression (19) below; the above Expression (12) by Expression (20) below; the above Expression (13) by Expression (21) below; the above Expression (14) by Expression (22) below; the above Expression (15) by Expression (23) below.

$$XT_b \approx \frac{3.7}{D^3}\left(\frac{\ln 10}{10}\alpha_{b,dB}\right)^2 L_b \quad (18)$$

$$\approx 0.20\frac{\alpha_{b,dB}^2}{D^3}L_b$$

$$XT_b \approx \frac{1.1}{D^3}\left(\frac{\ln 10}{10}\alpha_{b,dB}\right)^2 L_b \quad (19)$$

$$\approx 0.059\frac{\alpha_{b,dB}^2}{D^3}L_b$$

$$0.20\frac{\alpha_{b,dB}^2}{D^3}L_b \le XT_{b,max} \quad (20)$$

$$\alpha_{b,dB}L_b \le \sqrt{D^3\frac{XT_{b,max}}{0.20}L_b}$$

$$0.059\frac{\alpha_{b,dB}^2}{D^3}L_b \le XT_{b,max} \quad (21)$$

$$\alpha_{b,dB}L_b \le \sqrt{D^3\frac{XT_{b,max}}{0.059}L_b}$$

$$\alpha_{90deg} \le \sqrt{D^3\frac{XT_{b,max90deg}}{0.20}\frac{\pi}{2}10^{-3}R_b} \quad (22)$$

$$\alpha_{90deg} \le \sqrt{D^3\frac{XT_{b,max90deg}}{0.059}\frac{\pi}{2}10^{-3}R_b} \quad (23)$$

The below is the description common to the first and second embodiments of the optical fibers.

For making the housing of the OT more compact (or more downsized), the optical fiber satisfies the aforementioned Expression (14) or Expression (15) (likewise, Expression (22) or Expression (23)) preferably with $R_b$ being not more than 7 mm, more preferably with $R_b$ being not more than 6 mm, still more preferably with $R_b$ being not more than 5 mm, yet more preferably with $R_b$ being not more than 4 mm, yet more preferably with $R_b$ being not more than 3 mm, yet more preferably with $R_b$ being not more than 2 mm, and yet more preferably with $R_b$ being not more than 1 mm.

Figure 12:
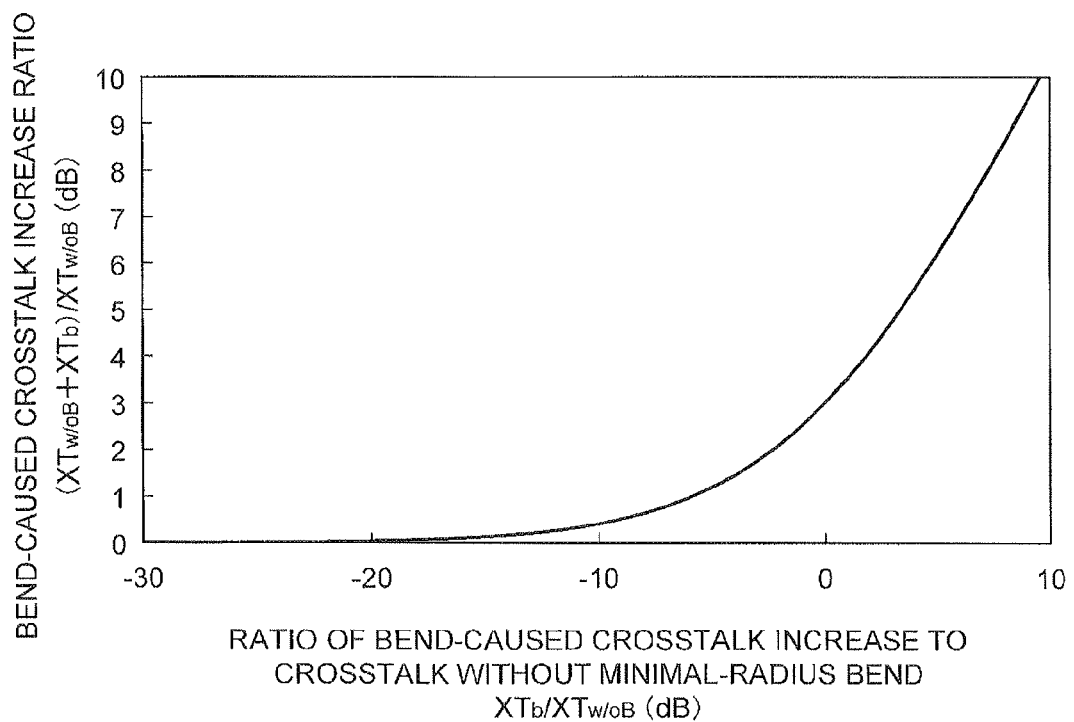
FIG. 12 is a drawing showing a relationship between $XT_b/XT_{w/oB}$, which represents a ratio of crosstalk increase $XT_b$ due to minimal bend, to crosstalk $XT_{w/oB}$ without a minimal-radius bend, and $(XT_{w/oB}+XT_b)/XT_{w/oB}$, a crosstalk increase ratio with a minimal-radius bend.

FIG. 12 shows a relationship between $XT_b/XT_{w/oB}$, which represents a ratio of minimal-bend-caused crosstalk increase $XT_b$ to crosstalk $XT_{w/oB}$ in a state without the minimal-radius bend, and $(XT_{w/oB}+XT_b)/XT_{w/oB}$, a crosstalk increase ratio with the minimal-radius bend. According to FIG. 12, in order to avoid a sudden rise of $(XT_{w/oB}+XT_b)/XT_{w/oB}$ is preferably not more than 2 (not more than 3 dB) and more preferably not more than 1.26 (not more than 1 dB). Due to the same reason, $XT_b/XT_{w/oB}$ is preferably not more than 1 (not more than 0 dB) and more preferably not more than ¼ (not more than −6 dB). In order to satisfy the above relationship, $XT_{b,max90deg}$ in Expression (14) or Expression (15) (similarly, in Expression (22) or Expression (23)) is preferably not more than $XT_{w/oB}$ and more preferably not more than $XT_{w/oB}/4$.

Namely, the crosstalk $XT_{w/oB}$ to a predetermined core from other cores at a predetermined wavelength with the optical fiber having no bend in the radius of curvature of less than 30 mm is preferably not more than −20 dB, and the crosstalk to the predetermined core from other cores at the predetermined wavelength with the optical fiber having a 90° bend in a predetermined radius of curvature $R_b$ [mm] not more than the radius of curvature of 7 mm is preferably not more than 2 times and more preferably not more than 1.26 times $XT_{w/oB}$. $XT_{w/oB}$ is preferably measured in a state in which almost entire length of the optical fiber is in the range of radius of curvature from 30 mm to 200 m, and the upper limit of the radius of curvature in the measurement, in terms of suppressing $XT_b$ even if $XT_{w/oB}$ is smaller, is more preferably 100 cm, still more preferably 50 cm, yet more preferably 30 cm, yet more preferably 20 cm, most preferably 10 cm.

Figure 13:
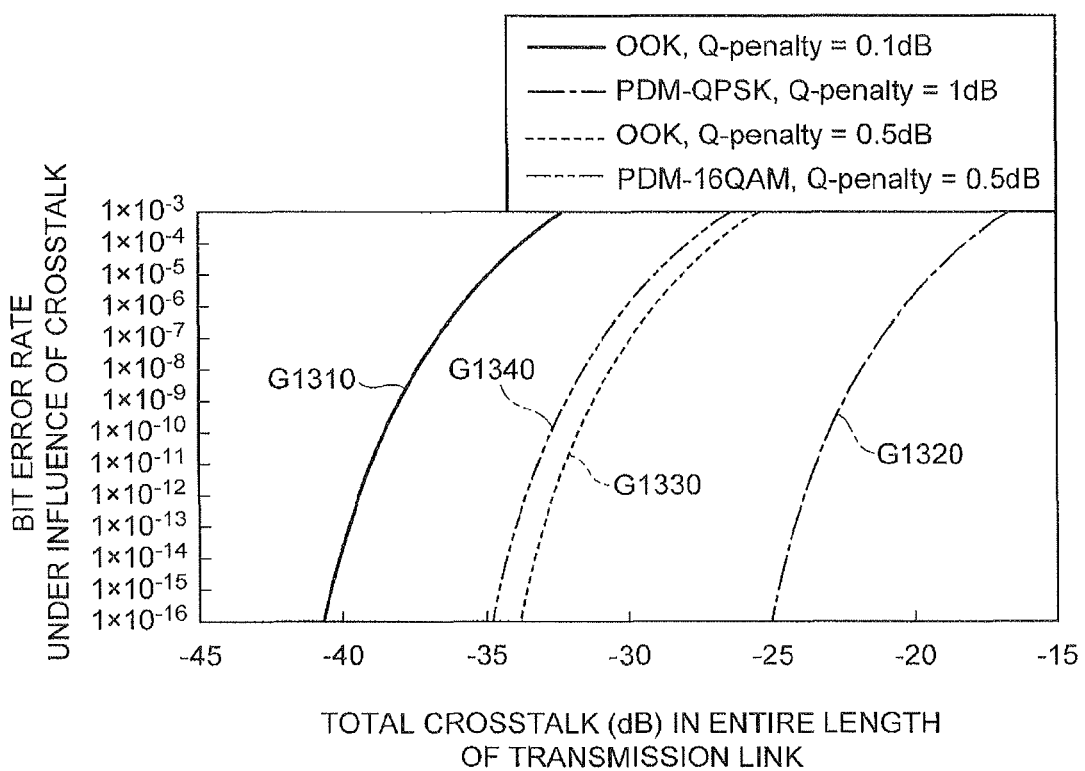
FIG. 13 is a drawing showing relationships between total crosstalk through an entire length of an optical transmission link and bit error rate under influence of crosstalk, with several permissible values of penalty due to crosstalk for transmission quality Q-value.

Next, FIG. 13 shows relationships between total crosstalk through the entire length of the optical transmission link and bit error rate under influence of crosstalk, at several levels of permissible values (Q-Penalty) as crosstalk-caused penalty for transmission quality Q-value when a modulation method employed is On-Off-Keying (OOK), Polarization Division Multiplexed-Quadrature Phase Shift Keying (PDM-QPSK), or Polarization-Division-Multiplexed 16-ary Quadrature-Amplitude Modulation (PDM-16QAM). Specifically, concerning the relationship between modulation method and Q-Penalty (dB) in each graph, graph G1310 shows 0.1 dB in the modulation method OOK, graph G1320 1 dB in the modulation method PDM-QPSK, graph G1330 0.5 dB in the modulation method OOK, and graph G1340 0.5 dB in the modulation method PDM-16QAM.

From the relationships between total crosstalk $XT_{total}$ through the entire length of the optical transmission link and bit error rate (BER), as shown in FIG. 13, let us consider, for example, a situation where only 0.1 dB is permitted as crosstalk-caused penalty (Q-penalty) for transmission quality Q-value, in the case of On-Off-Keying (OOK) frequently used in short-haul transmission. In this situation, for realizing error-free transmission with BER<$10^{-14}$, $XT_{total}$ needs to be not more than −40 dB (equivalent to the linear value of not more than $10^{-4}$). On the other hand, in a situation where 1 dB is permitted as Q-Penalty in the case of Polarization Division Multiplexed-Quadrature Phase Shift Keying (PDM-QPSK) frequently used in long-haul transmission, for realizing BER<$10^{-3}$ to enable satisfactory error-free transmission by hard-decision error correction, $XT_{total}$ needs to be not more than −17 dB (equivalent to the linear value of not more than $2\times10^2$). Furthermore, in a situation where 0.5 dB is permitted as Q-Penalty in the case of Polarization-Division-Multiplexed 16-ary Quadrature-Amplitude Modulation (PDM- 16QAM) expected to be used for long-haul transmission in future, for realizing BER<10$^{-3}$ to enable satisfactory error-free transmission by hard-decision error correction, $XT_{total}$ needs to be not more than −27 dB (equivalent to the linear value of not more than 2×10$^{-3}$).

Figure 14:
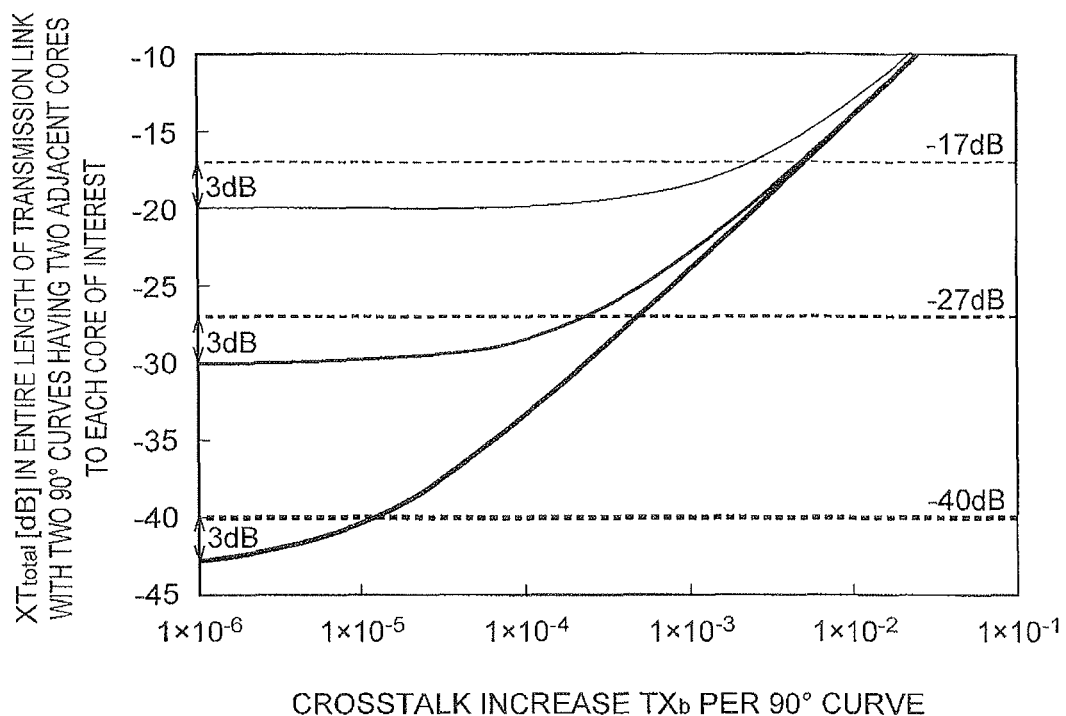
FIG. 14 is a drawing showing relationships between bend-caused crosstalk increase $XT_b$ per 90° bent portion and $XT_{total}$, in the case of a configuration where there are two 90° bent portions in an extremely small radius of curvature and where crosstalk in the part other than the 90° bent portions has a margin of 3 dB for permissible maximum $XT_{total}$.

FIG. 14 shows relationships between bend-caused crosstalk increase $XT_b$ per 90°-bent portion and $XT_{total}$ in the case of the configuration of FIG. 1A where there are two 90°-bent portions in an extremely small radius of curvature, in an optical transmission link configuration using an optical fiber wherein there are two closest cores to a certain core, and where the crosstalk in the part other than the 90°-bent portions has the margin of 3 dB for the permissible maximum $XT_{total}$. In FIG. 14, the data is plotted for the cases of permissible maximum $XT_{total}$ being −17 dB, −27 dB, and −40 dB, and it is seen in each of the cases that with increase of $XT_b$, $XT_{total}$ starts suddenly increasing at a certain point. In order to suppress a considerable increase of $XT_{total}$ and keeping it smaller than the permissible maximum $XT_{total}$, it is seen from FIG. 14 that, as the relationship between the permissible maximum value of $XT_{total}$ and the upper limit of the corresponding $XT_b$, $XT_b$ is not more than about 10$^{-3}$ in the case of $XT_{total}$ being −17 dB (not more than −20 dB), $XT_b$ is not more than about 10$^{-4}$ in the case of $XT_{total}$ being −27 dB (not more than −30 dB), and $XT_b$ is not more than about 10$^{-5}$ in the case of $XT_{total}$ being −40 dB (not more than −43 dB). Therefore, $XT_{b,\,max90deg}$ in Expression (14) and Expression (15) (also similarly in Expression (22) and Expression (23)) is preferably not more than 10$^{-3}$, more preferably not more than 10$^{-4}$, and still more preferably not more than 10$^{-5}$.

Examples of cross sections perpendicular to an axis extending in the longitudinal direction of the optical fibers suitably used in the embodiments are shown in FIGS. 15A to 15D. In the examples of FIGS. 15A to 15D, plural cores 511 of an identical core-structure are covered by a cladding 512 having a lower refractive index than the cores 511. Preferably, the outside of the cladding 512 is covered by a coating 513 as shown in the examples of FIGS. 15A to 15D.

Figure 15A:
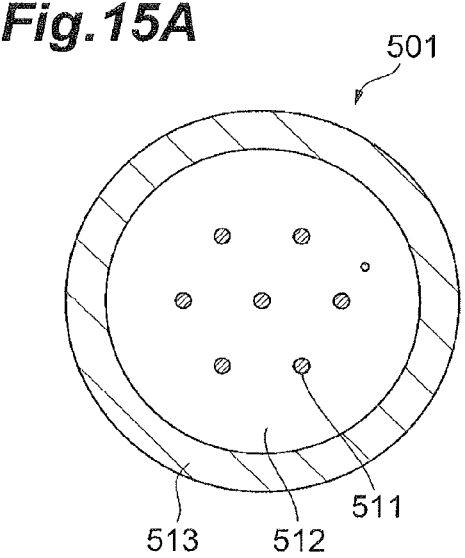
FIGS. 15A to 15D are drawings showing examples of cross sections perpendicular to an axis extending in a longitudinal direction of multi-core optical fibers.
Figure 15B:
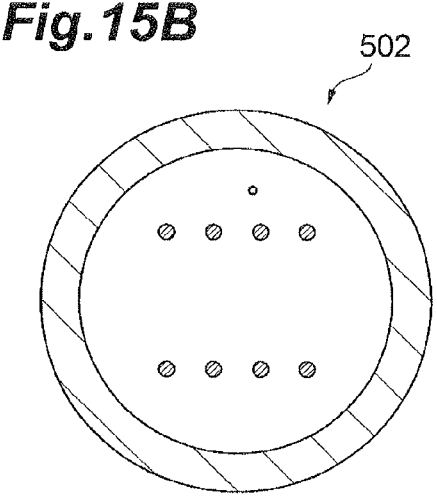
Figure 15C:
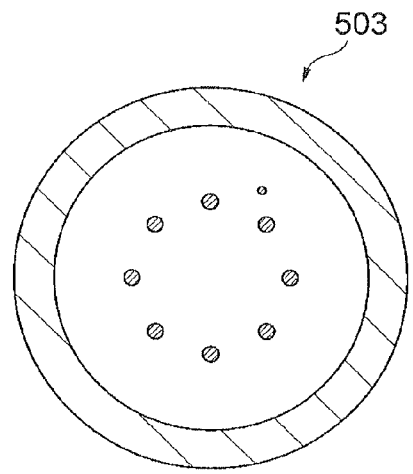
Figure 15D:
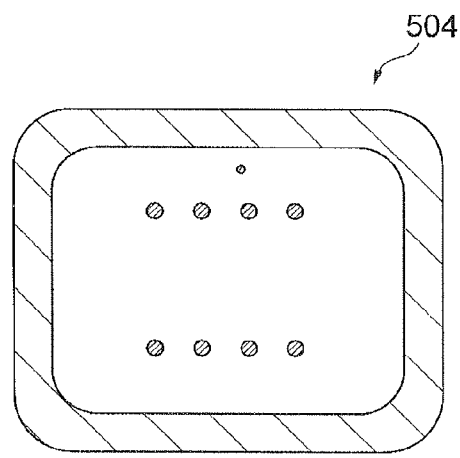

The optical fiber 501 in FIG. 15A has seven cores 511, one in the center of the optical fiber and six around it, and core-to-core distances are equal. The optical fiber 502 in FIG. 15B has two sets of four cores 511 arranged in a line and separated in parallel with each other. The optical fiber 503 in FIG. 15C has eight cores 511 arranged at equal intervals on a predetermined circumference. Furthermore, the optical fiber 504 in FIG. 15D has the cladding 512 in an approximately rectangular cross section formed so that each set of four cores 511 of the optical fiber 502 in FIG. 15B is located on the long-edge side.

In the foregoing optical fibers 501 to 504, for suppressing propagation of the cladding mode, the refractive index of the coating 513 is preferably higher than that of the cladding 512, and more preferably higher than that of the cores 511. In view of preventing increase of transmission loss of the cores 511 due to coupling to the coating 513, of light propagating in the cores 511 near the interface between the cladding 512 and the coating 513, the refractive index of the coating 513 is preferably lower than that of the cores 511. It should be noted that the numbers and constellations of the cores do not have to be limited to those in the examples shown in FIGS. 15A to 15D. A preferred constituent material of the cores and the cladding is glass or resin and a more preferred material is pure silica glass or silica glass containing an additive. A preferred constituent material of the coating is resin, carbon, or metal. The coating may be comprised of a plurality of layers comprised of different materials.

When the fiber length is not more than 10 km, the aforementioned action is effectively achieved; however, in use of a short-haul transmission (transmission in high performance computing, data center, and the like) in which many bends with a minimal diameter can be provided, it is more preferable that a crosstalk increase ratio is suppressed in a fiber length of not more than 1 km, still more preferable that a crosstalk increase ratio is suppressed in a fiber length of not more than 100 m, and most preferable that a crosstalk increase ratio in a fiber length of not more than 10 in, in the light of suppressing the crosstalk increase ratio $(XT_{w/oB}+XT_b)/XT_{w/oB}$ even if $XT_{w/oB}$ in the entire length of an optical fiber is small due to a short fiber length.

The minimum value D of center-to-center distance between adjacent cores in the foregoing optical fibers is preferably in the range of 15 to 60 μm, and the upper limit thereof is, in the light of downsizing, more preferably not more than 50 μm, still more preferably not more than 40 μm, and most preferably not more than 30 μm.

In the light of blocking high-order spatial modes not used in signal transmission, a loss in the radius of curvature $R_b$ of higher-order spatial modes than a predetermined spatial mode of the cores is preferably at least 19.3 dB per 90° larger than a loss in the radius of curvature $R_b$ of the predetermined spatial mode. The loss in the radius of curvature of 140 mm of the higher-order spatial modes than the predetermined spatial mode of the cores is preferably not less than 1 dB/in and the loss in the radius of curvature of 140 mm of the predetermined spatial mode is preferably not more than 0.1 dB/m. Furthermore, the foregoing predetermined spatial mode is preferably a higher-order spatial mode other than a fundamental mode.

We can also adopt a mode wherein the predetermined spatial mode is the fundamental mode and wherein the mode field diameter of the fundamental mode at a predetermined wavelength can be fallen within the range of 5.6 μm to 15.7 μm (more preferably not less than 7.9 μm). When the predetermined wavelength belongs to the predetermined wavelength band of for example 1.26 μm to 1.625 μm, a general optical communication can be realized. Specifically, When the foregoing predetermined wavelength is 1.31 μm and the cable cutoff wavelength of the cores is not more than 1.29 μm, the optical fiber can be applied to O-band. Furthermore, when the predetermined wavelength is 1.49 μm and the cable cutoff wavelength of the cores is not more than 1.46 μm, the optical fiber can be applied to S-band. Moreover, when the predetermined wavelength is 1.55 μm and the cable cutoff wavelength of the cores is not more than 1.53 μm, the optical fiber can be applied to C-band.

The examples shown in FIGS. 15A to 15D show a part of the examples of cross sections perpendicular to the axis extending in the longitudinal direction of the optical fibers, and it should be noted that the cross-sectional shapes of the optical fibers do not have to be limited to those shown in FIGS. 15A to 15D.

Figure 16A:
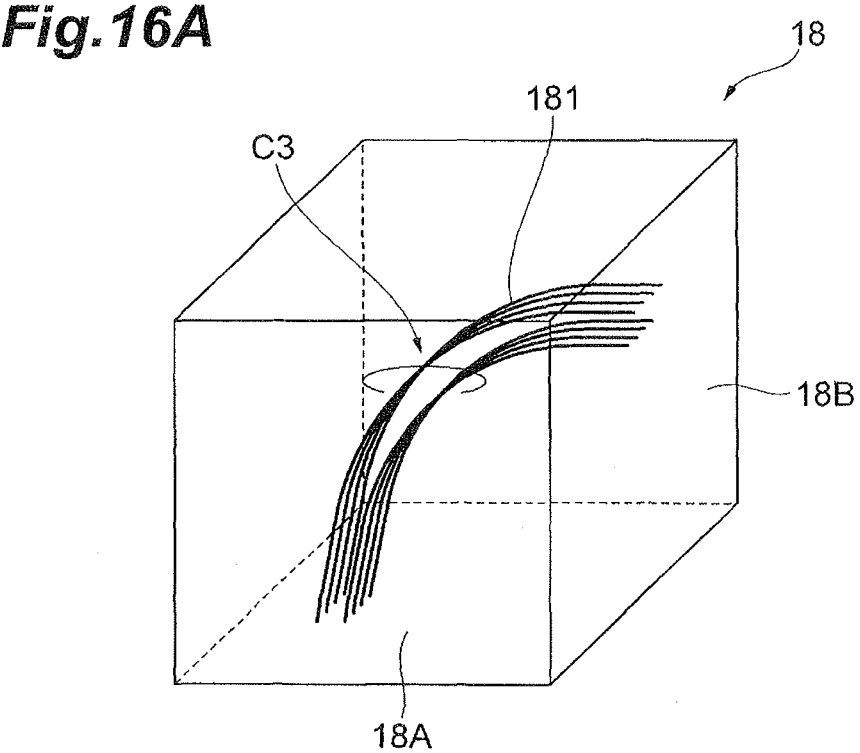
FIGS. 16A and 16B are drawings showing an example of a configuration of a multi-core optical waveguide according to an embodiment of the present invention.
Figure 16B:
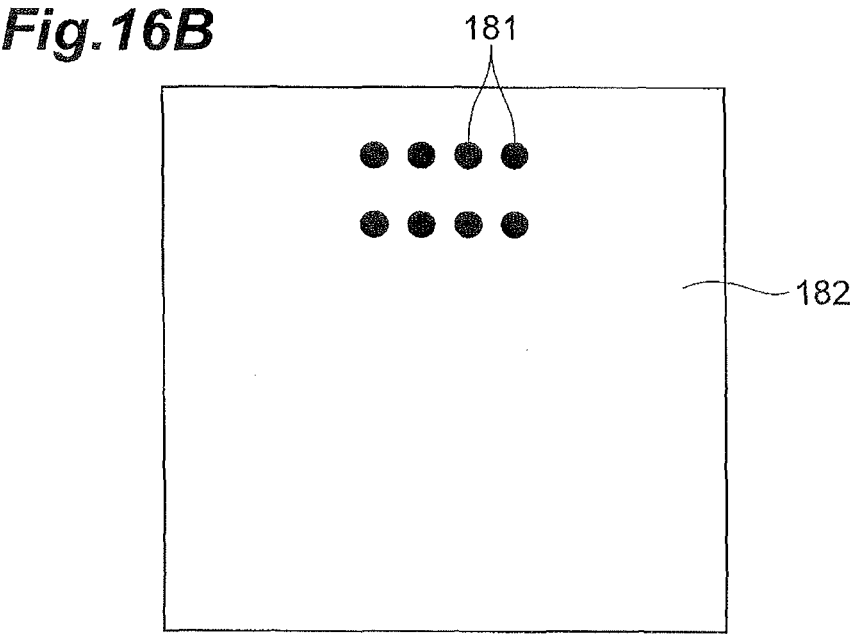

Next, an example of a configuration of an optical waveguide according to an embodiment of the present invention is shown in FIGS. 16A and 16B and FIGS. 17A and 17B. This optical waveguide is one used in the optical transmission link 2 shown in FIG. 2. FIG. 16A is a perspective view illustrating the configuration of the optical waveguide 18 and FIG. 16B a drawing illustrating a first plane 18A (first surface) and a second plane 18B (second surface) in which cores of the optical waveguide are exposed.

The optical waveguide 18 has plural cores 181 of an identical core-structure covered by a cladding 182 having a lower refractive index than the cores 181. The cladding 182 may be covered by a coating. Light can be guided through the first plane 18A and the second plane 18B of the optical waveguide 18 into or out of the cores 181. Each core 181 has a bent portion C3 in an extremely small radius of curvature (not more than 10 mm).

Figure 17A:
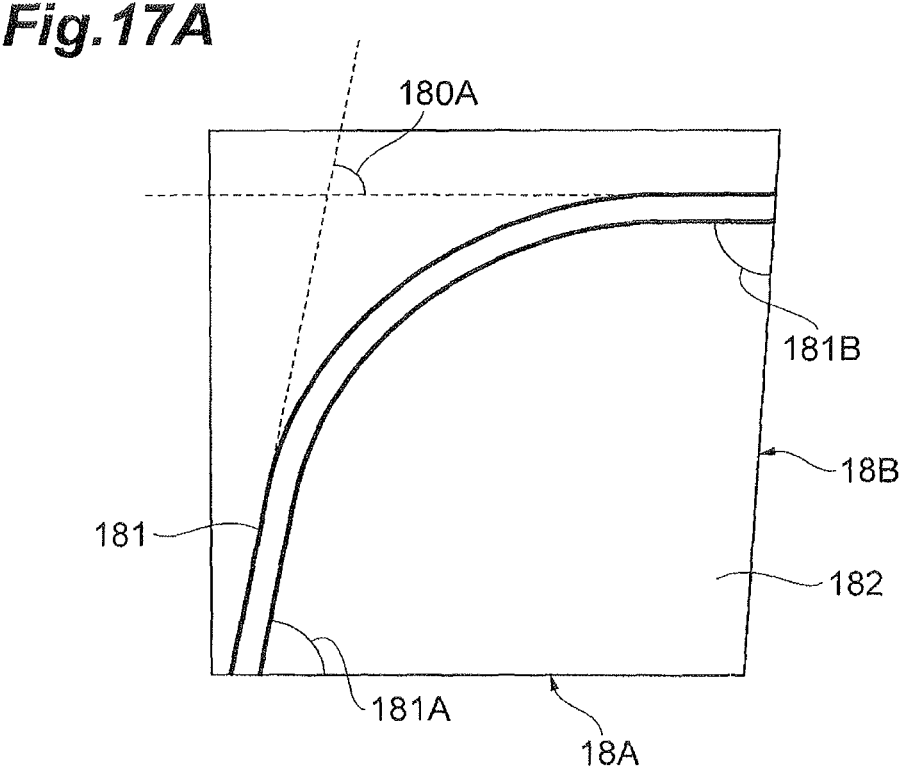
FIGS. 17A and 17B are drawings showing examples of configurations of multi-core optical waveguides according to an embodiment of the present invention.
Figure 17B:
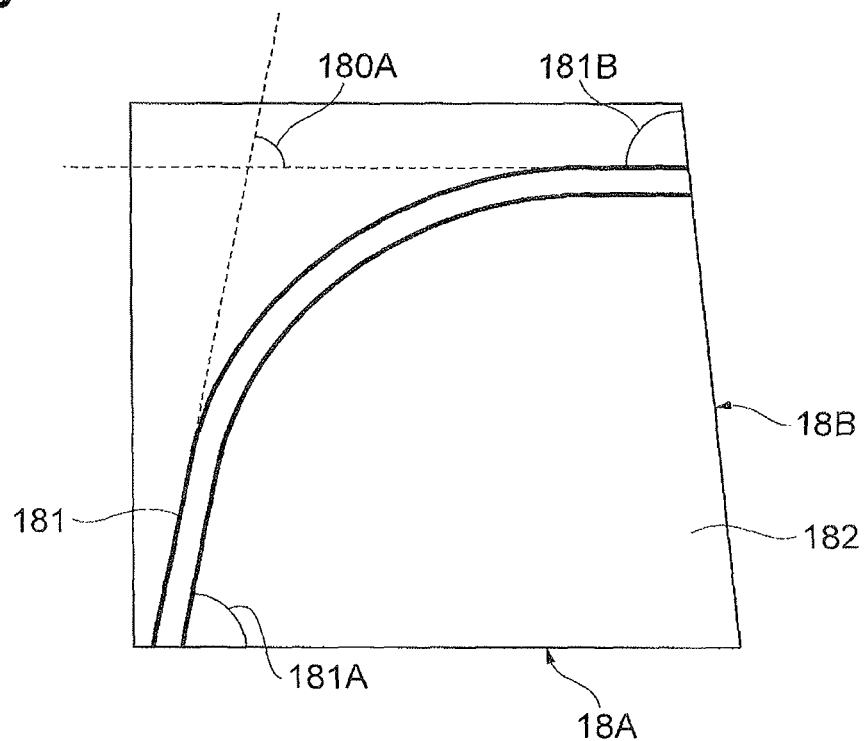

The bent portion will be further described using FIGS. 17A and 17B. FIG. 17A is an example where an angle between the first plane 18A and the second plane 18B is larger than 90° and FIG. 17B an example where the angle between the first plane 18A and the second plane 18B is smaller than 90°. As shown in FIGS. 17A and 17B, the plural cores 181 in bent portion C3 are arranged in parallel and bent in the range of 58° to 90°. Namely, an angle 180A, serving as a supplementary angle of the bent portion in FIGS. 17A and 17B, is preferably in the range of 58° to 90° and more preferably in the range of 74° to 90°. An angle 181A between the first plane 18A and the cores 181 and an angle 181B between the second plane 18B and the cores 181 are preferably right angles, however in the light of suppressing that the reflected light at an end surface enter the cores, an acute angles is preferably not less than 74° and more preferably in the range of 81° to 83°. Since the number of cores and the core constellation are adequately changed according to the optical fiber, they are not limited to those in the example shown in FIGS. 16A, 16B and FIGS. 17A, 17B. The core constellation and core diameter in the first plane 18A may be different from those in the second plane 18B. A preferred constituent material of the cores 181 and cladding 182 of the optical waveguide 18 is glass or resin and a more preferred constituent material is pure silica glass or silica glass containing an additive.

For achieving downsizing, it is preferable that the height of cores of optical waveguide, namely the height of from 18A to the height of the lowest core at 18B is changed according to a radius of curvature of the cores. For example, the height of the cores of the optical waveguide with respect to the radius of curvature of the bent portions of the cores is preferably not more than 10 mm with respect to not more than 7 mm, not more than 9 mm with respect to not more than 6 mm, not more than 9 mm and more preferably not more than 8 mm with respect to not more than 5 mm, not more than 7 mm with respect to not more than 4 mm, not more than 6 mm with respect to not more than 3 mm, not more than 5 mm with respect to not more than 2 mm, and not more than 4 mm with respect to not more than 1 mm.

When the minimum radius of curvature is denoted by $R_b$, the bending loss of each of the cores in the optical waveguide of the present invention, as in the case of the optical fibers of the present invention, satisfies Expression (14) or Expression (15) preferably with $R_b$ being not more than 7 mm, more preferably not more than 6 mm, still more preferably not more than 5 mm, yet more preferably not more than 4 mm, yet more preferably not more than 3 mm, yet more preferably not more than 2 mm, and most preferably not more than 1 mm. In an optical waveguide in which a bending loss cannot be measured since the bend of the cores as a component is fixed, no distinction is made between transmission loss due to scattering and absorption in the optical waveguide and bending loss; however, at least an insertion loss of the optical waveguide can be measured. The insertion loss is preferably smaller than the right side of the aforementioned Expression (14) or Expression (15). $R_b$ is preferably a smaller radius of curvature, such as not more than 7 mm, not more than 6 mm, not more than 5 mm, not more than 4 mm, not more than 3 mm, not more than 2 mm, and not more than 1 mm. As considering a desire bend supplementary angle be 90°, similar to the case of the optical fibers of the present invention, $XT_{b,\ max90deg}$ is preferably at least not more than $10^{-3}$, more preferably not more than $10^{-4}$, and still more preferably not more than $10^{-5}$.

For allowing use of an ultraviolet curable adhesive in bonding the foregoing optical waveguide 18 to the SPC 14 and the optical fiber 20 as shown in FIG. 2, the optical waveguide 18 preferably transmits ultraviolet light 10% or more. The optical waveguide 18 preferably has the crosstalk of not more than −20 dB (0.01) while having the bent portion C3 in the extremely small radius of curvature (not more than 10 mm).

In view of application using each two cores as a pair and performing signal transmissions in mutually opposite directions through the respective cores, the number of cores in the optical fibers and optical waveguides of the present invention is preferably an even number. Furthermore, in view of improvement in core density (the number of cores per cross-sectional area), the number of cores is preferably four or more, and the cores are preferably arranged on a hexagonal lattice. In view of splitting of light from one common light source into beams to all the cores, the number of cores is preferably a power of 2. Furthermore, in view of coupling to a light input/output circuit of the SPC, the cores are preferably arranged on a rectangular lattice. For balancing the core density and the coupling to the SPC, the cores are preferably arranged at equal intervals on an identical circle.

The aforementioned optical waveguide preferably has the insertion loss of higher-order spatial modes than the predetermined spatial mode being at least 19.3 dB larger than the insertion loss of the predetermined spatial mode.

The mode field diameter of the fundamental mode of the cores at a predetermined wavelength is preferably in the range of 5.6 μm to 15.7 μm and more preferably not less than 7.9 μm. Then, the predetermined wavelength is preferably any one wavelength in the range of 1.26 μm to 1.625 μm.

The core-periphery structure in the optical fibers and optical waveguides according to the present embodiments is preferably the matched-cladding type in which the cladding having the given refractive index is provided around the core and more preferably the trench-assisted type in which the trench layer having a lower refractive index than the cladding in the cladding portion around the core. In the case of the trench-assisted type, an inside cladding layer having a refractive index lower than that of the cores and higher than that of the trench layer may be provided between the trench layer and the core.

Figure 18:
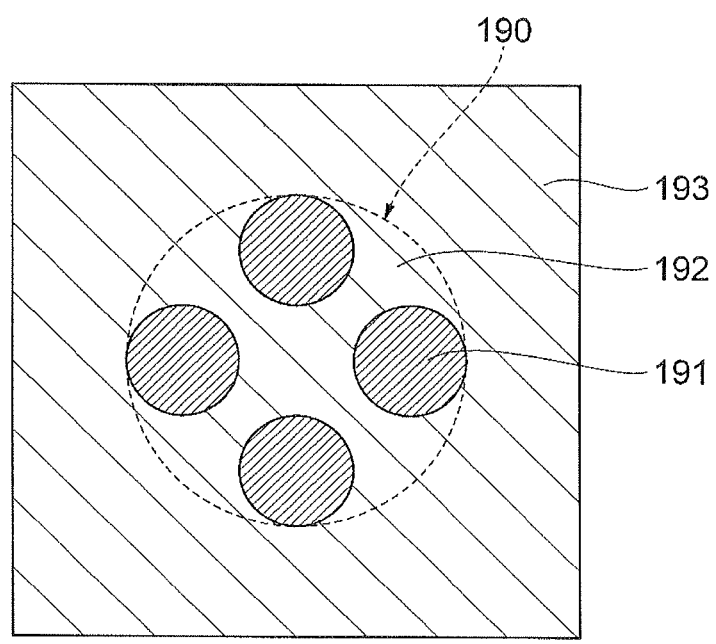
FIG. 18 is a drawing illustrating a modification example of a configuration of a core in a multi-core optical fiber and a multi-core optical waveguide according to an embodiment of the present invention.

A core 190 in the optical fibers and optical waveguides according to the present embodiments is preferably one provided, as shown in FIG. 18, with plural core-forming cores (sub-cores) 191 of an identical core-structure having a higher refractive index than a cladding 193 and a cladding (sub-cladding) 192 constituting the core 190 and having a lower refractive index than the sub-cores 191, and the number of spatial modes of the core 190 is preferably at least not less than the number of the sub-cores 191. Adjacent sub-cores 191 may be in contact or in no contact with each other. The refractive index of the sub-cladding 192 may be equal or unequal to that of the cladding 193. In the optical fiber herein, crosstalk between adjacent sub-cores 191 is preferably not less than −10 dB inside the core 190 and a difference of average powers of light between all the sub-cores in the same core on the exit side with injection of light into only one sub-core is more preferably within 1 dB. In the optical waveguide, the crosstalk between sub-cores is preferably at least 10 dB larger than the crosstalk between cores and more preferably at least 20 dB.

The bending loss in this specification is a decrease of intensity of light in a core due to leakage of light propagating in the core, into the cladding, but in general, when measurement of the bending loss of optical fiber is carried out with the fiber being bent in a given radius of curvature, the light leaking once from the core into the cladding is reflected at the interface between the cladding and the coating and at the interface between the coating and air to return to the core to be re-coupled thereto and the re-coupled light causes interference with the light propagating in the core while not leaking into the cladding, whereby the bending loss actually observed can become larger and smaller than the intrinsic bending loss of the core itself (i.e., values fluctuate against wavelength change). Therefore, the bending loss is preferably determined as follows: a wavelength dependence of bending loss is measured in an actual fiber, fitting with an exponential curve is made for the wavelength dependence of bending loss, and a value at a predetermined wavelength of the exponential curve is used as a bending loss at the predetermined wavelength, which is used as the bending loss in the present invention excluding influence of the interference. Another preferred method is as follows: the fitting is performed with a straight line for the wavelength dependence of the logarithm of the bending loss, a value at a predetermined wavelength of the straight line is obtained as the logarithm of the bending loss, and the bending loss is calculated from it, which is used as the bending loss in the present invention excluding influence of the interference.

Figure 19:
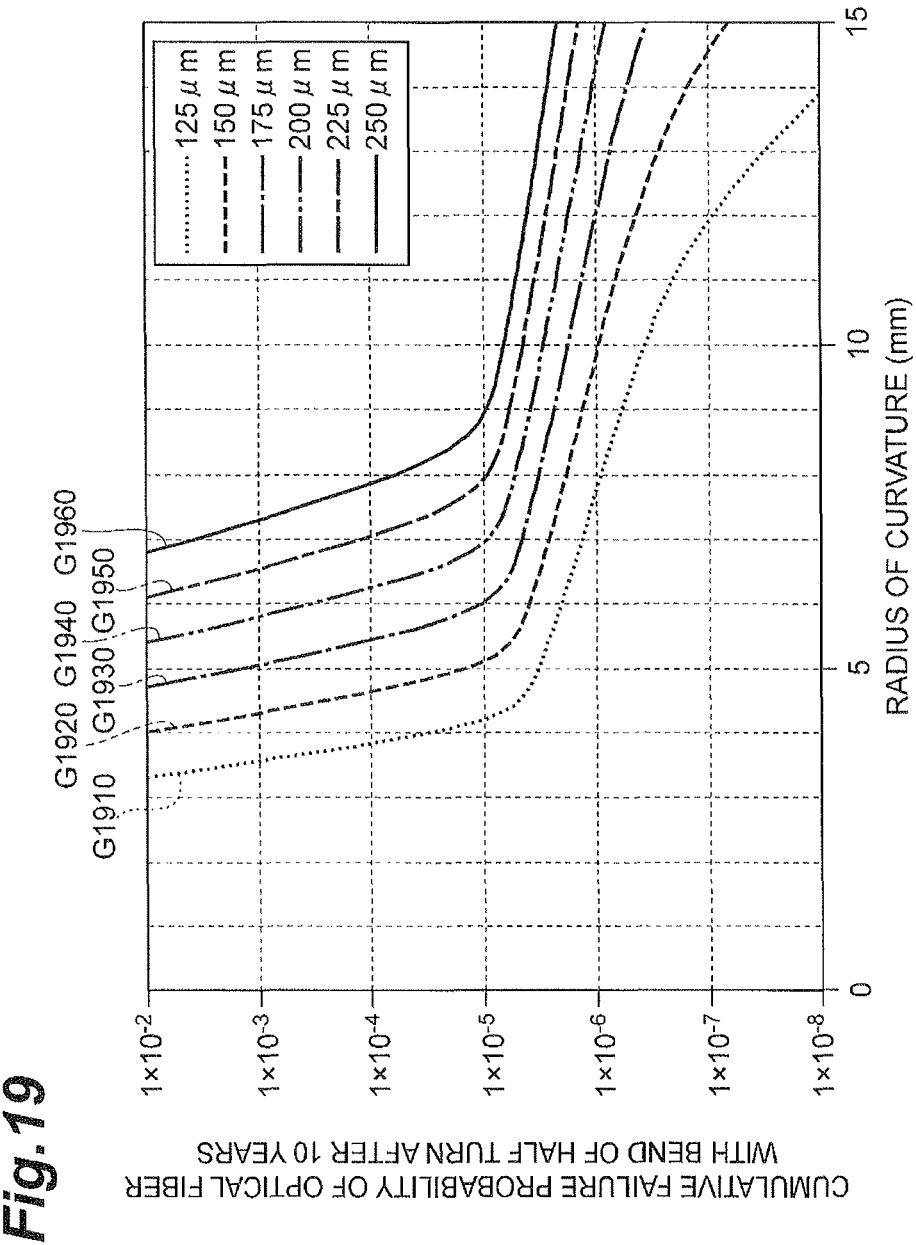
FIG. 19 is a drawing showing radius-of-curvature dependences of cumulative failure probability of optical fibers after 10 years with a bend of two 90° curves in the optical fibers, at several levels of cladding diameters.

When the cladding of the optical fiber is made of silica glass, a bend of the optical fiber in an extremely small radius of curvature poses a problem that a probability of failure of the optical fiber becomes high. FIG. 19 shows radius-of-curvature dependences of cumulative failure probability of optical fibers after 10 years with a bend of two 90° curves (i.e., a half turn), at several levels of cladding diameters. Specifically, each of graphs G1910 to 1960 shows a radius-of-curvature dependency of the optical fiber with each cladding diameter, and the cladding diameter of each graph is 125 μm in graph G1910, 150 μm in graph G1920, 175 μm in graph G1930, 200 μm in graph G1940, 225 μm in graph G1950, and 250 μm in graph G1960. In the one-core fiber with the ordinary cladding diameter of 125 μm, the cumulative failure probability suddenly worsens at the radii of curvature of not more than 4 mm. In the optical fiber, as the number of cores in the cladding increases, the cladding diameter tends to be larger than 125 μm. Since the cladding diameter increases in association with increase of the number of cores, the radius of curvature is need to be increase in order to reduce a failure probability. The radius of curvature that the cladding diameter and the cumulative failure probability suddenly worsens, is not more than 5 mm when the cladding diameter is 150 μm, not more than 6 mm when the cladding diameter is 175 μm, not more than 7 mm when the cladding diameter is 200 μm, not more than 8 mm when the cladding diameter is 225 μm, and not more than 9 mm when the cladding diameter is 250 μm. The optical fiber breaks with a bend because of stress applied to glass by the bend. Here, by carrying out a thermal treatment during a bending operation of the optical fiber to relieve the stress-generated strain due to the bend, the optical fiber becomes less likely to break even if the optical fiber is bent in an extremely small radius of curvature. FIG. 19 shows graphs in a state that such a thermal treatment is not carried out. In the case of the optical fiber given with the thermal treatment, since it can be assumed that the bending stress is relieved under a minimal bending, a problem concerning fracture lifetime probably decrease.

In view of the above, when the optical fiber is considered to be used in the transmission system shown in FIG. 1A, the optical fiber of the present invention is the optical fiber having the bent portion with a bend of not less than 58°. In the bent portion thereof, the stress generated strain caused inside the fiber by the bend is relieved by the thermal treatment. Even without external stress, the bent portion is preferably bent in the range of not less than 58° while the predetermined radius of curvature $R_b$ is set at a small radius of not more than 10 mm, and the problem concerning failure probability is low in even such a state. The bend angle is not limited to the above values, and the lower limit of bend angle permits the both cases of not less than 74° and not less than 84°. The foregoing bend angle is, as described in the four paragraphs following the first paragraph of the DESCRIPTION OF THE EMBODIMENTS including Table 1, preferably the right angle, but in the light of suppressing the reflected light at the end surface entering a core again, it is preferably the acute angle of not less than 74° and more preferably 81° to 83°.

Specific configurations of the optical fibers according to the aforementioned second embodiment will be described below.

(1) As a first configuration, an optical fiber according to the second embodiment is an optical fiber in which plural cores of an identical core-structure are covered by a cladding having a lower refractive index than the cores, wherein when D [μm] represents a minimum value of center-center distance between adjacent cores, the minimum value D is a value in the range of 15 μm to 60 μm, a crosstalk $XT_{w/oB}$ to a predetermined core from other cores at a predetermined wavelength with the optical fiber having no bend in a radius of curvature of less than 30 mm is not more than −20 dB (0.01), and a crosstalk to the predetermined core from other cores at the predetermined wavelength with the optical fiber having a 90° bend in a predetermined radius of curvature $R_b$ [mm] not more than 7 mm is not more than twice $XT_{w/oB}$.

(2) As a second configuration applicable to the first configuration, the optical fiber has a trench layer with a relative refractive-index difference of not more than −0.1% with respect to the cladding, between the cores and the cladding.

(3) As a third configuration, an optical fiber according to the second embodiment is an optical fiber in which plural cores of an identical core-structure are covered by a cladding having a lower refractive index than the cores, the optical fiber having no layer with a relative refractive-index difference of not more than −0.1% with respect to the cladding, between the cores and the cladding, wherein when D [μm] represents a minimum value of center-center distance between adjacent cores and π the ratio of the circumference of a circle to its diameter, the minimum value D is a value in the range of 15 μm to 60 μm, a crosstalk $XT_{w/oB}$ to a predetermined core from other cores at a predetermined wavelength with the optical fiber having no bend in a radius of curvature of less than 30 mm is not more than −20 dB (0.01), a bending loss per 90° $\alpha_{90deg}$ of the predetermined core at the predetermined wavelength with the optical fiber having a 90° bend in a predetermined radius of curvature $R_b$ [mm] not more than 7 mm is not more than a value represented by Expression (24) below:

$$\sqrt{D^3 \frac{XT_{w/oB}}{0.20} \frac{\pi}{2} 10^{-3} R_b} \quad [\text{dB}/90°], \tag{24}$$

and a difference of the bending loss $\alpha_{90deg}$ between the plural cores of the identical core-structure is not more than 1 dB.

(4) As a fourth configuration, an optical fiber according to the second embodiment is an optical fiber in which plural cores of an identical core-structure are covered by a cladding having a lower refractive index than the cores, the optical fiber having a trench layer with a relative refractive-index difference of not more than −0.1% with respect to the cladding, between the cores and the cladding, wherein when D [μm] represents a minimum value of center-center distance between adjacent cores and n the ratio of the circumference of a circle to its diameter, the minimum value D is a value in the range of 15 μm to 60 μm, a crosstalk $XT_{w/oB}$ to a predetermined core from other cores at a predetermined wavelength with the optical fiber having no bend in a radius of curvature of less than 30 mm is not more than −20 dB (0.01), a bending loss per 90° $\alpha_{90deg}$ of the predetermined core at the predetermined wavelength with the optical fiber having a 90° bend in a predetermined radius of curvature $R_b$ [mm] not more than 7 mm is not more than a value represented by Expression (25) below:

$$\sqrt{D^3 \frac{XT_{w/oB}}{0.059} \frac{\pi}{2} 10^{-3} R_b} \quad [dB/90°], \quad (25)$$

and a difference of the bending loss $\alpha_{90deg}$ between the plural cores of the identical core-structure is not more than 1 dB.

(5) As a fifth configuration applicable to the second or fourth configuration, the optical fiber has an inside cladding layer having a refractive index lower than that of the cores and higher than that of the trench layer, between the cores and the trench layer.

(6) As a sixth configuration applicable to at least any one of the first to fifth configurations, a fiber length of the optical fiber is not more than 10 km.

(7) As a seventh configuration, an optical fiber according to the second embodiment is an optical fiber in which plural cores of an identical core-structure are covered by a cladding having a lower refractive index than the cores, the optical fiber having no layer with a relative refractive-index difference of not more than −0.1% with respect to the cladding, between the cores and the cladding, wherein when D [μm] represents a minimum value of center-center distance between adjacent cores and it the ratio of the circumference of a circle to its diameter, the minimum value D is a value in the range of 15 μm to 60 μm, a crosstalk $XT_{w/oB}$ to a predetermined core from other cores at a predetermined wavelength with the optical fiber having no bend in a radius of curvature of less than 30 mm is not more than −20 dB (0.01), a bending loss per 90° $\alpha_{90deg}$ of the predetermined core at the predetermined wavelength with the optical fiber having a 90° bend in a predetermined radius of curvature $R_b$ [mm] not more than the radius of curvature of 7 mm is not more than a value represented by Expression (26) below:

$$\sqrt{D^3 \frac{10^{-3}}{0.20} \frac{\pi}{2} 10^{-3} R_b} \quad [dB/90°], \quad (26)$$

and a difference of the bending loss $\alpha_{90deg}$ between the plural cores of the identical core-structure is not more than 1 dB.

(8) As an eighth configuration, an optical fiber according to the second embodiment is an optical fiber in which plural cores of an identical core-structure are covered by a cladding having a lower refractive index than the cores, the optical fiber having a trench layer with a relative refractive-index difference of not more than −0.1% with respect to the cladding, between the cores and the cladding, wherein when D [μm] represents a minimum value of center-center distance between adjacent cores and π the ratio of the circumference of a circle to its diameter, the minimum value D is a value in the range of 15 μm to 60 μm, a crosstalk $XT_{w/oB}$ to a predetermined core from other cores at a predetermined wavelength with the optical fiber having no bend in a radius of curvature of less than 30 mm is not more than −20 dB (0.01), a bending loss per 90° $\alpha_{90deg}$ of the predetermined core at the predetermined wavelength with the optical fiber having a 90° bend in a predetermined radius of curvature $R_b$ [mm] not more than 4 mm is not more than a value represented by Expression (27) below:

$$\sqrt{D^3 \frac{10^{-3}}{0.059} \frac{\pi}{2} 10^{-3} R_b} \quad [dB/90°], \quad (27)$$

and a difference of the bending loss $\alpha_{90deg}$ between the plural cores of the identical core-structure is not more than 1 dB.

(9) As a ninth configuration applicable to the eighth configuration, the optical fiber has an inside cladding layer having a refractive index lower than that of the cores and higher than that of the trench layer, between the cores and the trench layer.

(10) As a tenth configuration applicable to at least any one of the first to ninth configurations, a loss in the radius of curvature $R_b$ of higher-order spatial modes than a predetermined spatial mode of the cores is at least 19.3 dB per 90° larger than a loss in the radius of curvature $R_b$ of the predetermined spatial mode.

(11) As an eleventh configuration applicable to at least any one of the first to ninth configurations, a loss in the radius of curvature of 140 mm of higher-order spatial modes than a predetermined spatial mode of the cores is not less than 1 dB/m, and a loss in the radius of curvature of 140 mm of the predetermined spatial mode is not more than 0.1 dB/m.

(12) As a twelfth configuration applicable to the tenth configuration or the eleventh configuration, the predetermined spatial mode is a higher-order spatial mode other than a fundamental mode.

(13) As a thirteenth configuration applicable to at least any one of the first to twelfth configurations, the core comprises plural sub-cores having a higher refractive index than the cladding and a sub-cladding having a lower refractive index than the sub-cores, the plural sub-cores all have an identical core-structure, the number of spatial modes of the core is at least not less than the number of the sub-cores, and a crosstalk between the sub-cores adjacent to each other inside the core is not less than −10 dB.

(14) As a fourteenth configuration applicable to at least any one of the first to eleventh configurations, the predetermined spatial mode is a fundamental mode, and a mode field diameter of the predetermined spatial mode at the predetermined wavelength is in the range of 5.6 µm to 15.7 µm.

(15) As a fifteenth configuration applicable to at least any one of the first to fourteenth configurations, the predetermined wavelength is any one wavelength in the range of 1.26 µm to 1.625 µm.

(16) As a sixteenth configuration applicable to the fourteenth configuration, the predetermined wavelength is 1.31 µm, and a cable cutoff wavelength of the core is not more than 1.29 µm.

(17) As a seventeenth configuration applicable to the fourteenth configuration, the predetermined wavelength is 1.49 µm, and a cable cutoff wavelength of the core is not more than 1.46 µm.

(18) As an eighteenth configuration applicable to the fourteenth configuration, the predetermined wavelength is 1.55 µm, and a cable cutoff wavelength of the core is not more than 1.53 µm.

(19) As a nineteenth configuration, an optical fiber according to the second embodiment is an optical fiber in which plural cores of an identical core-structure are covered by a cladding having a lower refractive index than the cores and the cladding is covered by an integral coating, the optical fiber having a trench layer with a relative refractive-index difference of not more than −0.1% with respect to the cladding, between the cores and the cladding, wherein when D [µm] represents a minimum value of center-center distance between adjacent cores and n the ratio of the circumference of a circle to its diameter, the minimum value D is a value in the range of 15 µm to 60 µm, a crosstalk between adjacent cores at the center-center distance D at a predetermined wavelength is not more than −20 dB (0.01), a cable cutoff wavelength of the cores is not more than 1.29 µm, a bending loss per 90° $\alpha_{90deg}$ of the predetermined core at the predetermined wavelength with the optical fiber having a 90° bend in a predetermined radius of curvature $R_b$ [mm] not more than 4 mm is not more than a value represented by Expression (28) below:

$$\sqrt{D^3 \frac{10^{-3}}{0.059} \frac{\pi}{2} 10^{-3} R_b} \quad [\text{dB}/90°], \quad (28)$$

and a difference of the bending loss $\alpha_{90deg}$ between the plural cores of the identical core-structure is not more than 1 dB.

(20) As a twentieth configuration applicable to the nineteenth configuration, the optical fiber has an inside cladding layer having a refractive index lower than that of the cores and higher than that of the trench layer, between the cores and the trench layer.

(21) As a twenty first configuration applicable to at least any one of the first to seventh and the tenth to twentieth configurations, the predetermined radius of curvature $R_b$ is not more than 5 mm.

(22) As a twenty second configuration applicable to at least any one of the first to twenty first configurations, the optical fiber is an optical fiber having a bent portion with a bend of not less than 58°, wherein stress caused inside the fiber by the bend is relieved in the bent portion, and wherein the bent portion has the bend of not less than 58° in the predetermined radius of curvature $R_b$ as a minimum radius of curvature, even without external stress.

(23) A twenty third configuration relates to an optical fiber transmission system, the optical fiber transmission system comprising a transmitter, a receiver, and a transmission line, wherein the transmission line comprises an optical fiber having at least any one of the first to twenty second configurations, wherein each of the transmitter and the receiver comprises a waveguide chip capable of implementing input/output of light, and a housing internally having the waveguide chip, wherein the input/output of light into or out of the waveguide chip is implemented at an angle in the range of 74° to 90° from a surface of the chip, and wherein in the housing, the optical fiber is optically connected at an angle in the range of 74° to 90° to the waveguide chip with the optical fiber having a bend in the radius of curvature $R_b$ [mm].

(24) A twenty fourth configuration relates to an optical waveguide, the optical waveguide being an optical waveguide in which plural cores of an identical core-structure are covered by a cladding having a lower refractive index than the cores, wherein each of the cores has a bent portion in a minimum radius of curvature of not more than 10 mm, wherein a direction of a central axis of each core is bent in the range of 58° to 90° by the bent portion, the optical waveguide having at least two planes capable of implementing input/output of light into or out of each core, with the bent portion in between, wherein a height of the optical waveguide with one of the planes being defined as a bottom surface is not more than 13 mm, wherein a minimum value D [µm] of center-center distance between adjacent cores is a value in the range of 15 µm to 60 µm, and wherein a crosstalk between adjacent cores at the center-to-center distance D at a predetermined wavelength is not more than −20 dB (0.01).

(25) As a twenty fifth configuration applicable to the twenty fourth configuration, the minimum radius of curvature of the cores is not more than 7 mm, and the height of the optical waveguide with one of the planes being defined as a bottom surface is not more than 10 mm.

(26) As a twenty fifth configuration applicable to the twenty fourth configuration, the minimum radius of curvature of the cores is not more than 5 mm, and the height of the optical waveguide with one of the planes being defined as a bottom surface is not more than 8 mm.

(27) As a twenty seventh configuration applicable to at least any one of the twenty fourth to twenty sixth configurations, no layer with a relative refractive-index difference of not more than −0.1% with respect to the cladding is provided between the cores and the cladding, when $R_b$ [mm] represent a minimum radius of curvature of the cores and a the ratio of the circumference of a circle to its diameter, an insertion loss at the predetermined wavelength of the cores is not more than a value represented by Expression (29) below:

$$\sqrt{D^3 \frac{10^{-3}}{0.20} \frac{\pi}{2} 10^{-3} R_b} \quad [dB], \tag{29}$$

and a difference of the insertion loss between the plural cores of the identical core-structure is not more than 1 dB.

(28) As a twenty eighth configuration applicable to at least any one of the twenty fourth to twenty sixth configurations, the optical waveguide comprises a trench layer with a relative refractive-index difference of not more than −0.1% with respect to the cladding, between the cores and the cladding, a direction of a central axis of each core is bent in the range of 76° to 90° by the bent portion, when $R_b$ [mm] represent a minimum radius of curvature of the cores and π the ratio of the circumference of a circle to its diameter, an insertion loss at the predetermined wavelength of the cores is not more than a value represented by Expression (30) below:

$$\sqrt{D^3 \frac{10^{-3}}{0.059} \frac{\pi}{2} 10^{-3} R_b} \quad [dB], \tag{30}$$

and a difference of the insertion loss between the plural cores of the identical core-structure is not more than 1 dB.

(29) As a twenty ninth configuration applicable to the twenty eighth configuration, the optical waveguide has an inside cladding layer having a refractive index lower than that of the cores and higher than that of the trench layer, between the cores and the trench layer.

(30) As a thirtieth configuration applicable to at least any one of the twenty fourth to twenty ninth configurations, at the predetermined wavelength, an insertion loss of higher-order spatial modes than a predetermined spatial mode is at least 19.3 dB larger than an insertion loss of the predetermined spatial mode.

(31) As a thirty first configuration applicable to the thirtieth configuration, the predetermined spatial mode is a higher-order spatial mode other than a fundamental mode.

(32) As a thirty second configuration applicable to at least any one of the twenty fourth to thirty first configurations, the core comprises plural sub-cores having a higher refractive index than the cladding and a sub-cladding having a lower refractive index than the sub-cores, the plural sub-cores all have an identical core-structure, the number of spatial modes of the core is at least not less than the number of the sub-cores, and a crosstalk between the sub-cores adjacent to each other inside the core is not less than −10 dB (0.1).

(33) As a thirty third configuration applicable to at least any one of the twenty fourth to thirty first configurations, a mode field diameter of a fundamental mode of the cores at the predetermined wavelength is in the range of 5.6 μm to 15.7 μm.

(34) As a thirty fourth configuration applicable to at least any one of the twenty fourth to thirty third configurations, the predetermined wavelength is any one wavelength in the range of 1.26 μm to 1.625 μm.

(35) A thirty fifth configuration relates to an optical fiber transmission system, the optical fiber transmission system comprising a transmitter, a receiver, and a transmission line, wherein the transmission line comprises an optical fiber, wherein each of the transmitter and the receiver comprises a waveguide chip with a function to implement input or output of signal light, and a housing internally having the waveguide chip, wherein the input/output of signal light into or out of the waveguide chip is implemented at an angle in the range of 74° to 90° from a surface of the chip, and wherein in the housing, the optical fiber is optically connected to the waveguide chip through the optical waveguide having any one of the twenty fourth to thirty second configurations.

The present embodiment provides the optical fibers, optical waveguides, and optical fiber transmission systems in which the increase of crosstalk is suppressed even with a bend in a small radius of curvature.

What is claimed is:

1. An optical waveguide comprising: plural cores including a pair of adjacent cores with an identical core-structure; a cladding covering each of plural cores; a first surface on which one ends of the plural cores are disposed; and a second surface on which the other ends of the plural cores are disposed, the plural cores extending from the first surface to the second surface, wherein a minimum value D [μm] of center-to-center distance between the adjacent cores is a value in the range of 15 μm to 60 μm, and the optical waveguide satisfies any one condition of the following first to third conditions at a predetermined wavelength within a predetermined wavelength band, the first condition being defined by:

an optical fiber serving as the optical waveguide;

a difference of $\alpha_{90deg}$ between cores having the identical core-structure, the difference being not more than 1 dB where the $\alpha_{90deg}$ is defined as a bending loss per 90° of a predetermined core while the optical fiber has a 90° bend in a predetermined radius of curvature $R_b$ [mm] of not more than 4 mm;

a linear value serving as a virtual crosstalk in a 10-km fiber length between the adjacent cores at the center-to-center distance of the minimum value D, the linear value being not more than 0.01 where the optical fiber has bend in a predetermined radius of curvature of 30 mm to 200 cm; and the bending loss $\alpha_{90deg}$ of not more than a value represented by Expression (1) below where a linear value serving as a crosstalk in a predetermined fiber length of not more than 10 km is $XT_{w/oB}$ and the optical fiber has bend in the predetermined radius of curvature of 30 mm to 200 cm, or, the bending loss $\alpha_{90deg}$ of not more than a value represented by Expression (2) below where a cladding portion around each of the plural cores constitutes a trench-assisted type having a trench layer with a relative refractive-index difference of not more than −0.1% with respect to the cladding:

$$0.809\exp(6.64\times10^{-2}D)\sqrt{XT_{w/oB}R_b}[dB/90°] \tag{1}$$

and $$1.42\exp(7.78\times10^2 D)\sqrt{XT_{x/oB}R_b}[dB/90°] \tag{2},$$

the second condition being defined by:

Expression (3) below being defined as Expression (1) from which a definition concerning a fiber length is removed in the first condition; and Expression (4) below being defined as Expression (2) from which the definition concerning the fiber length is removed in the first condition:

$$0.809\exp(6.64\times10^{-2}D)\sqrt{10^{-3}R_b}[\text{dB}/90°] \quad (3); \text{ and}$$

$$1.42\exp(7.78\times10^{-2}D)\sqrt{10^{-3}R_b}[\text{dB}/90°] \quad (4),$$

the third condition being defined by:
a bent portion of each of the plural cores, the bent portion being fixed in the radius of curvature $R_b$ of not more than 7 mm;
a crosstalk between the adjacent cores at the D serving as an adjacent core distance, the crosstalk being not more than 0.01;
a bend supplementary angle falling within the range of 58° to 90°, the bend supplementary angle corresponding to a supplementary angle to an angle at a bending center side out of angles defined by straight portions sandwiching the bent portion in each of the plural cores;
a plane serving as each of the first surface and the second surface, the plane enabling light entrance and light emission to each of the plural cores; and
a height of the optical waveguide with one of the first surface and the second surface being defined as a bottom surface, the height being not more than 10 mm; wherein the optical waveguide satisfies the first condition or the second condition, and wherein each of the plural cores guides multiple spatial modes; wherein each of the plural cores comprises plural sub-cores and a sub-cladding having a lower refractive-index lower than the plural sub-cores, each of the plural sub-cores has an identical refractive-index profile structure, wherein the number of spatial modes of each of the plural cores is at least not less than the number of the plural sub-cores, and wherein inside each of the plural cores, a crosstalk between adjacent sub-cores is not less than 0.1.

2. The optical waveguide according to claim 1, wherein the optical waveguide satisfies the first condition or the second condition, and
wherein the optical waveguide comprises an inside cladding layer between each of the plural cores and the associated trench layer, the inside cladding having a refractive-index lower than that of each of the plural cores and higher than that of the associated trench layer.

3. The optical waveguide according to claim 1, wherein the optical waveguide satisfies the first condition or the second condition,
wherein a spatial mode of each of the plural cores is a fundamental mode, and
wherein a mode field diameter of the spatial mode at the predetermined wavelength falls within the range of 5.6 μm to 15.7 μm.

4. The optical waveguide according to claim 1, wherein the optical waveguide satisfies the first condition or the second condition, and
wherein the predetermined wavelength band is 1.26 μm to 1.625 μm.

5. The optical waveguide according to claim 1, wherein the optical waveguide satisfies the first condition or the second condition, and
wherein a cable cutoff wavelength of each of the plural cores is not more than 1.29 μm, not more than 1.46 μm or not more than 1.53 μm.

6. The optical waveguide according to claim 1, wherein the optical waveguide satisfies the first condition or the second condition,
wherein each of the plural cores has a cable cutoff wavelength of not more than 1.29 μm, and a mode field diameter at a wavelength of 1.31 μm falls within the range of 8.0 μm to 10.1 μm, and
wherein at any one wavelength of 1.49 μm and 1.55 μm, the optical waveguide satisfies any one condition of the following fourth to seventh conditions,
the fourth condition being defined by:
the bending loss $\alpha_{90deg}$ in the $R_b$ of 4 mm being not more than 0.139 dB/90°; or
the bending loss $\alpha_{90deg}$ in the $R_b$ of 4 mm being not more than 0.288 dB/90° where the trench layer with the relative refractive-index difference of not more than −0.1% with respect to the cladding is provided between each of the plural cores and the cladding,
the fifth condition being defined by:
the bending loss $\alpha_{90deg}$ in the $R_b$ of 3 mm being not more than 0.120 dB/90°; or
the bending loss $\alpha_{90deg}$ in the $R_b$ of 3 mm being not more than 0.250 dB/90° where the trench layer with the relative refractive-index difference of not more than −0.1% with respect to the cladding is provided between each of the plural cores and the cladding,
the sixth condition being defined by:
the bending loss $\alpha_{90deg}$ in the $R_b$ of 2 mm being not more than 0.098 dB/90°; or
the bending loss $\alpha_{90deg}$ in the $R_b$ of 2 mm being not more than 0.204 dB/90° where the trench layer with the relative refractive-index difference of not more than −0.1% with respect to the cladding is provided between each of the plural cores and the cladding,
the seventh condition being defined by:
the bending loss $\alpha_{90deg}$ in the $R_b$ of 1 mm being not more than 0.069 dB/90°; or
the bending loss $\alpha_{90deg}$ in the $R_b$ of 1 mm being not more than 0.144 dB/90° where the trench layer with the relative refractive-index difference of not more than −0.1% with respect to the cladding is provided between each of the plural cores and the cladding.

7. The optical waveguide according to claim 1, wherein the optical waveguide satisfies the first condition or the second condition,
wherein a cable cutoff wavelength of each of the plural cores is not more than 1.26 μm,
wherein a mode field diameter at a wavelength of 1.31 μm falls within the range of 8.0 μm to 10.1 μm,
wherein at a wavelength of 1.49 μM, a bending loss $\alpha_{90deg}$ in the $R_b$ of 4 mm is not more than 0.139 dB/90°, and
wherein the trench layer with the relative refractive-index difference of not more than −0.2% with respect to the cladding is provided between each of the plural cores and the cladding, and at the wavelength of 1.49 μm, the bending loss $\alpha_{90deg}$ in the $R_b$ of 4 mm is not more than 0.288 dB/90° where a relative refractive-index of each of the plural cores with respect to the cladding falls within the range of 0.24% to 0.35%.

8. The optical waveguide according to claim 1, wherein the optical waveguide includes an optical fiber,
wherein the optical waveguide has the bent portion bent so that the bend supplementary angle falls within the range of 58° to 90°,
wherein in the bent portion, stress-generated strain caused inside the optical fiber by bending is relieved by a heat treatment processing, and
wherein the bent portion is bent with the supplementary angle while the $R_b$ is maintained even without external stress.

9. An optical fiber transmission system comprising a transmitter, a receiver, and an optical fiber as the optical waveguide according to claim 1, wherein each of the transmitter and the receiver comprises a waveguide chip capable of implementing input/output of light, and a housing internally having the waveguide chip, wherein each of the transmitter and the receiver is optically connected to the optical fiber so that a surface of the waveguide chip and the optical fiber take the form of an acute angle in the range of 74° to 90°, and wherein in the housing, the optical fiber is provided with a bent of the $R_b$.

10. The optical waveguide according to claim 1, wherein the optical waveguide satisfies the third condition, wherein where the height of the optical waveguide is defined as a lower height of the optical waveguide in the other surface while defining one of the first surface and the second surface as a bottom surface, the optical waveguide has either one of a first structure or a second structure, the first structure being defined by the $R_b$ of each of the plural cores of not more than 5 mm and the height of not more than 8 mm, the second structure being defined by the $R_b$ of each of the plural cores of not more than 3 mm and the height of not more than 6 mm.

11. The optical waveguide according to claim 1, wherein the optical waveguide satisfies the third condition, wherein a difference of insertion loss between the plural cores is not more than 1 dB at the predetermined wavelength, wherein the insertion loss is not more than a value represented by Expression (5) below, or, the insertion loss is not more than a value represented by Expression (6) below where the cladding portion around each of the plural cores constitutes the trench-assisted type having the trench layer with the relative refractive-index difference of not more than −0.1% with respect to the cladding:

$$0.809\exp(6.64\times10^{-2}D)\sqrt{10^{-3}R_b}[\text{dB}/90°] \quad (5); \text{and}$$

$$1.42\exp(7.78\times10^{-2}D)\sqrt{10^{-3}R_b}[\text{dB}/90°] \quad (6).$$

12. The optical waveguide according to claim 11, wherein the optical waveguide comprises an inside cladding layer between each of the plural cores and the associated trench layer, the inside cladding having a refractive-index lower than that of each of the plural cores and higher than that of the associated trench layer.

13. The optical waveguide according to claim 1, wherein the optical waveguide satisfies the third condition, and wherein the predetermined wavelength band is 1.26 μm to 1.625 μm, and a mode field diameter of a fundamental mode in each of the plural cores falls within the range of 5.6 μm to 15.7 μm.

14. An optical fiber transmission system comprising a transmitter, a receiver, and a transmission line, wherein the transmission line includes an optical fiber serving as the optical waveguide according to claim 1, wherein each of the transmitter and the receiver comprises a waveguide chip with a function to implement input/output of signal light, and a housing internally having the waveguide chip, wherein in the housing, the optical fiber is optically connected to the waveguide chip through the optical waveguide satisfying the third condition, as defined in claim 1, and wherein in each of the transmitter and the receiver, the surface of the waveguide chip and the plural cores of the optical waveguide in the housing take the form of acute angle in the range of 74° to 90°.

\* \* \* \* \*